(12) United States Patent
Mogi et al.

(10) Patent No.: US 7,127,445 B2
(45) Date of Patent: Oct. 24, 2006

(54) DATA MAPPING MANAGEMENT APPARATUS

(75) Inventors: Kazuhiko Mogi, Yokohama (JP); Yoshiaki Eguchi, Machida (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 10/236,216

(22) Filed: Sep. 5, 2002

(65) Prior Publication Data

US 2003/0229645 A1    Dec. 11, 2003

(30) Foreign Application Priority Data

Jun. 6, 2002   (JP)  .............................. 2002-165057

(51) Int. Cl.
*G06F 17/30* (2006.01)
(52) U.S. Cl. ..................... 707/1; 707/100; 707/101; 707/200
(58) Field of Classification Search .................. 707/1, 707/10, 200, 100, 101, 203, 205; 709/203, 709/246; 710/8, 62; 711/100, 167
See application file for complete search history.

(56) References Cited

U.S. PATENT DOCUMENTS

| | | | |
|---|---|---|---|
| 5,948,062 A * | 9/1999 | Tzelnic et al. | 709/219 |
| 5,956,750 A | 9/1999 | Yamamoto et al. | |
| 5,974,238 A * | 10/1999 | Chase, Jr. | 709/248 |
| 6,035,306 A | 3/2000 | Lowenthal | |
| 6,442,548 B1 * | 8/2002 | Balabine et al. | 707/10 |
| 6,446,141 B1 | 9/2002 | Nolan et al. | |
| 6,480,834 B1 * | 11/2002 | Engle et al. | 707/2 |
| 6,606,690 B1 * | 8/2003 | Padovano | 711/148 |

FOREIGN PATENT DOCUMENTS

| | | |
|---|---|---|
| JP | 9274544 | 10/1997 |
| JP | 2000-339098 | 11/2000 |
| JP | 2002-082775 A | 3/2002 |

OTHER PUBLICATIONS

Igarashi "Storage Management Solution in the SAN Environment," Fujitsu 52:118-123 (2001).

* cited by examiner

*Primary Examiner*—Alford Kindred
*Assistant Examiner*—Marc Filipczyk
(74) *Attorney, Agent, or Firm*—Townsend and Townsend and Crew LLP

(57) ABSTRACT

A data mapping management server collects data mapping information about functions for providing virtual storage regions, and provides an administrator with a management view on which the virtual storage regions created/managed in each virtual storage region providing function can be comprehensively grasped based on the collected information. The order to migrate data with the destination after mapping alteration can be accepted on interactive views. The data mapping management server produces a procedure plan for carrying out the accepted data mapping alteration order, and presents it to the administrator. The administrator decides if this plan can be carried out. If the administrator permits this plan to be carried out, the server orders each virtual storage region providing function to migrate data and create new virtual storage regions according to the produced plan.

6 Claims, 14 Drawing Sheets

FIG. 3

MAPPING INFORMATION (10)

| HIGHER VIRTUAL STRUCTURE IDENTIFIER (302) | HIGHER INTRA-STRUCTURE BLOCK NUMBER (304) | LOWER VIRTUALIZATION FUNCTION IDENTIFIER (306) | LOWER MANAGEMENT STRUCTURE IDENTIFIER (308) | LOWER INTRA-STRUCTURE BLOCK NUMBER (310) |
|---|---|---|---|---|
| Upper 0 | 0 - 10239 | LowApp0 | Lower 0 | 0 - 10239 |
| | 10240 - 20479 | LowApp1 | Lower 1 | 0 - 10239 |
| Upper 1 | 0 - 10239 | LowApp0 | Lower 0 | 10240 - 20479 |
| | 10240 - 20479 | LowApp1 | Lower 1 | 10240 - 20479 |
| ⋮ | ⋮ | ⋮ | ⋮ | ⋮ |
| "Free" | - | LowApp0 | Lower 0 | 10240 - 20479 |
| | ⋮ | ⋮ | ⋮ | ⋮ |

LOAD INFORMATION (12)

| LOWER VIRTUALIZATION FUNCTION IDENTIFIER (306) | LOWER MANAGEMENT STRUCTURE IDENTIFIER (308) | LOWER INTRA-STRUCTURE BLOCK NUMBER (310) | LOAD INFORMATION CUMULATIVE VALUE (314) |
|---|---|---|---|
| LowApp0 | Lower 0 | 0 - 10239 | 73897298 |
| LowApp1 | Lower 1 | 0 - 10239 | 67868721 |
| LowApp0 | Lower 0 | 10240 - 20479 | 4263872 |
| LowApp1 | Lower 1 | 10240 - 20479 | 3829389 |
| ⋮ | ⋮ | ⋮ | ⋮ |

FIG. 6

| VIRTUALIZATION FUNCTION IDENTIFIER | VSW1 | VSW1 | VSW2 | ... | 351 |
| --- | --- | --- | --- | --- | --- |
| LOWER VIRTUALIZATION FUNCTION IDENTIFIER | VSW2 | VSW3 | RAID1 | ... | 306 |
| LOWER MANAGEMENT STRUCTURE IDENTIFIER | Vol 2-1 | Vol 3-1 | LDev 1-1 | ... | 308 |
| LOWER INTRA-STRUCTURE BLOCK NUMBER | 0-10239 | 0-10239 | 0-10239 | ... | 310 |
| OLD LOAD INFORMATION CUMULATIVE VALUE | 22787638 | 38783484 | 7592039 | ... | 364 |
| LOAD INFORMATION COLLECTION VALUE — 2000/4/1 12:00 ~ 2000/4/1 12:15 | 17289 | 20123 | 9897 | ... | |
| 2000/4/1 12:15 ~ 2000/4/1 12:30 | 15672 | 19082 | 10982 | ... | 365 |
| 2000/4/1 12:30 ~ 2000/4/1 12:45 | 19781 | 22980 | 8892 | ... | |
| ⋮ | ⋮ | ⋮ | ⋮ | ⋮ | |

PREVIOUS LOAD INFORMATION CUMULATIVE VALUE ACQUISITION TIME : 2001/4/12 18:15 — 366

LOAD INFORMATION COLLECTION TABLE — 322

DATA MAPPING MANAGEMENT APPARATUS

BACKGROUND OF THE INVENTION

Field of the Invention

This invention relates to storage systems, and in particular to implementation of virtualization functionality in such systems, and more specifically, to implementation of virtualization in storage area network systems.

The capacity of the storage subsystems in a computer system has is increasing along with the increase of data stored in the computer system. The storage subsystems have been integrated by using SAN (Storage Area Network) as an exclusive network for the storage subsystems in order to reduce the costs of introduction, maintenance and management of large-capacity storage subsystems.

Since a plurality of computers and storage subsystems are connected by a single network under SAN environment, it is necessary to manage logical connection between computer and storage subsystem, and access restrictions to particular data. In addition, a network with switches such as by FC (Fibre Channel) is often used when SAN is configured. When this switch-based SAN becomes large sized, a network using a plurality of switches is formed, and it is necessary to manage the switches.

A management function for the integration of the management that particularly uses GUI (Graphical User Interface) is utilized in order to easily manage a plurality of switches. Management software for integrated operation of configuration management, access path management including device assignment, fault management and backup management in SAN using FC is proposed in I. Igarashi, "Storage Management Solution in SAN Environment", "FUJITSU", 2001-March, Vol. 52, No. 2, Serial Vol. 303, pp. 118–122, published by Fujitsu Ltd., ISSN 0016-2515.

As one of the most important managements in the computer system, there is a management of mapping of data on different layers such as operating systems, volume manager and subsystem (hereafter, called "data mapping"). U.S. Pat. No. 6,035,306 discloses a technique associated with the performance analysis tool for optimising the data mapping on a performance basis in the computer system for executing database management system (DBMS) in order to raise the efficiency of the data mapping management.

For the effective usage of the storage subsystems in SAN environment and easy management of the storage subsystem, another technique called "virtualization" is proposed for generating virtual storage regions by combining partial or all storage regions of physical storage drives, or devices for storing data, not using the physical storage drives themselves and for providing those regions to computers or application programs that are executed by the computers.

The virtualization includes a function to integrate a plurality of physical storage drives into a single virtual storage region, and another function to divide a single physical storage drive into a plurality of virtual storage regions.

In addition, JP-A-9-274544 discloses a technique that provides a logical storage device to computers whose data are mapped in the regions of physical storage drives, and a function to dynamically change stored data positions, thus improving the performance of access to storage subsystems by optimising the physically stored data positions.

Moreover, JP-A-2000-339098 discloses a technique for providing a virtualization function by apparatus called storage domain management system that is present between I/O paths within computer and storage subsystems. This apparatus provides computers with logical storage ranges called storage domain, or logical units of virtualized storage devices. Data is stored in the physical storage regions of the storage subsystem that this apparatus identifies. This apparatus provides the function of writing/reading data to/from the corresponding physical regions in response to the access request from computers. Furthermore, the storage domain management system provides a function to dynamically change the stored data positions.

Moreover, JP-A-2000-339098 discloses a technique for providing a virtualization function by apparatus called storage domain management system that is present between I/O paths within computer and storage subsystems. This apparatus provides computers with logical storage ranges called storage domain, or logical units of virtualized storage devices. Data is stored in the physical storage regions of the storage subsystem that this apparatus identifies. This apparatus provides the function of writing/reading data to/from the corresponding physical regions in response to the access request from computers. Furthermore, the storage domain management system provides a function to dynamically change the stored data positions.

SUMMARY OF THE INVENTION

The above virtualization function can be introduced into all apparatus associated with execution of I/O from computer to storage subsystem. Therefore, a computer system having the virtualization function can be constructed by a plurality of apparatus with virtualization functions. In this case, the user uses on a hierarchic basis the function of providing virtual storage regions.

When data mapping is altered in the computer system having the virtualization function, the user should know which apparatus provides the function of altering the data mapping, grasp the data mapping due to virtualization of storage regions in each apparatus, and decide how the data mapping should be altered by which apparatus, thereby producing a detailed processing procedure for the mapping alteration. After that, the user should issue sequence of commands to alter the data mapping.

Various techniques have so far been proposed as described above, such as a construction management view using GUI, an operating information display technique considering data mapping, and a technique for dynamically altering stored data positions. With a simple combination of these techniques, however, an administrator needs to further consider the details of a desired data mapping procedure. In some cases, the administrator needs not only to order to change the stored data positions but to produce new virtual storage regions and change the structure of virtual storage regions. However, it is not easy to produce these procedures for a desired data mapping considering highly hierarchical mapping, particularly in a large-scale computer system or in the case where certain data is shared by a plurality of computers.

It is an object of the invention to provide a computer system having a plurality of apparatus that provide virtual storage regions, or virtualization, and a method of easily changing, by the administrator, the data mapping that is executed in each apparatus according to the virtualization.

It is another object to provide a method of effective data mapping in a computer system having highly hierarchical virtual storage regions.

In order to achieve the above objects, according to the invention, there is provided a computer system for providing virtual storage regions, for example, a computer system using a plurality of switches as data transfer devices to provide highly hierarchical virtualization. The data mapping information in the switches are collected by computers that manage the data mapping, and the administrator is provided with a management view on which the administrator can comprehensively grasp on the basis of the collected information the virtual storage regions created/managed in each apparatus that provides the virtual storage regions. On the view, an order to transfer data to the destination at the time of mapping alteration is interactively accepted. A server for managing data mapping produces a procedure plan for carrying out the accepted data mapping alteration order, and proposes it to the administrator. The administrator decides if this plan can be carried out. If the administrator permits the plan to be carried out, the server orders each apparatus that provides virtual storage regions to migrate data or create new virtual storage regions according to the produced plan.

The data mapping management computer, when accepting the order to alter data mapping, display data that are to be altered in its mapping by use of the virtual storage regions in the apparatus that provide arbitrary storage regions, or the physical storage regions in storage subsystems. The data transfer destination at the time of data mapping alteration can be specified by selecting from virtual storage region providing apparatus, storage subsystems, and the virtual storage regions and physical storage regions provided by those apparatus and storage subsystems.

The data mapping management computer, when accepting the order to alter data mapping, display data that are to be altered in its mapping by use of the virtual storage regions in the apparatus that provide arbitray storage regions, or the physical storage regions in storage subsystems. The data transfer destination at the time of data mapping alteration can be specified by selecting from virtual storage region providing apparatus, storage subsystems, and the virtual storage regions and physical storage regions provied by those apparatus and storage subsystems.

In addition, according to the invention, the data mapping management computer produces a procedure plan for data mapping alteration, virtual region creation and structure alteration, which is necessary to achieve the data mapping alteration in a computer system. At this time, the data mapping management computer produces a data mapping alteration processing procedure plan in which all the regions used by a plurality of apparatus as the mapping alteration destination can be grasped and effectively utilized as necessary. Moreover, it is checked to see if the data to be changed in its mapping is shared by a plurality of computers. If it is shared, the data mapping management computer produces such a mapping alteration processing procedure as to make it possible to continue the data sharing without trouble during and after the data mapping alteration.

Furthermore, the data mapping management computer collects the load information on the virtual storage regions in the apparatus that provide the virtual storage regions or on the physical storage regions in the storage subsystems. When producing the data mapping alteration processing procedure plan, the data mapping management computer considers the load information so as to prevent the problems with access performance from easily occurring.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing data structure of mapping information 10.

FIG. 4 is a diagram showing data structure of load information 12.

FIG. 6 is a diagram showing data structure of load information collection table 322.

DESCRIPTION OF THE EMBODIMENT

Figure 1:
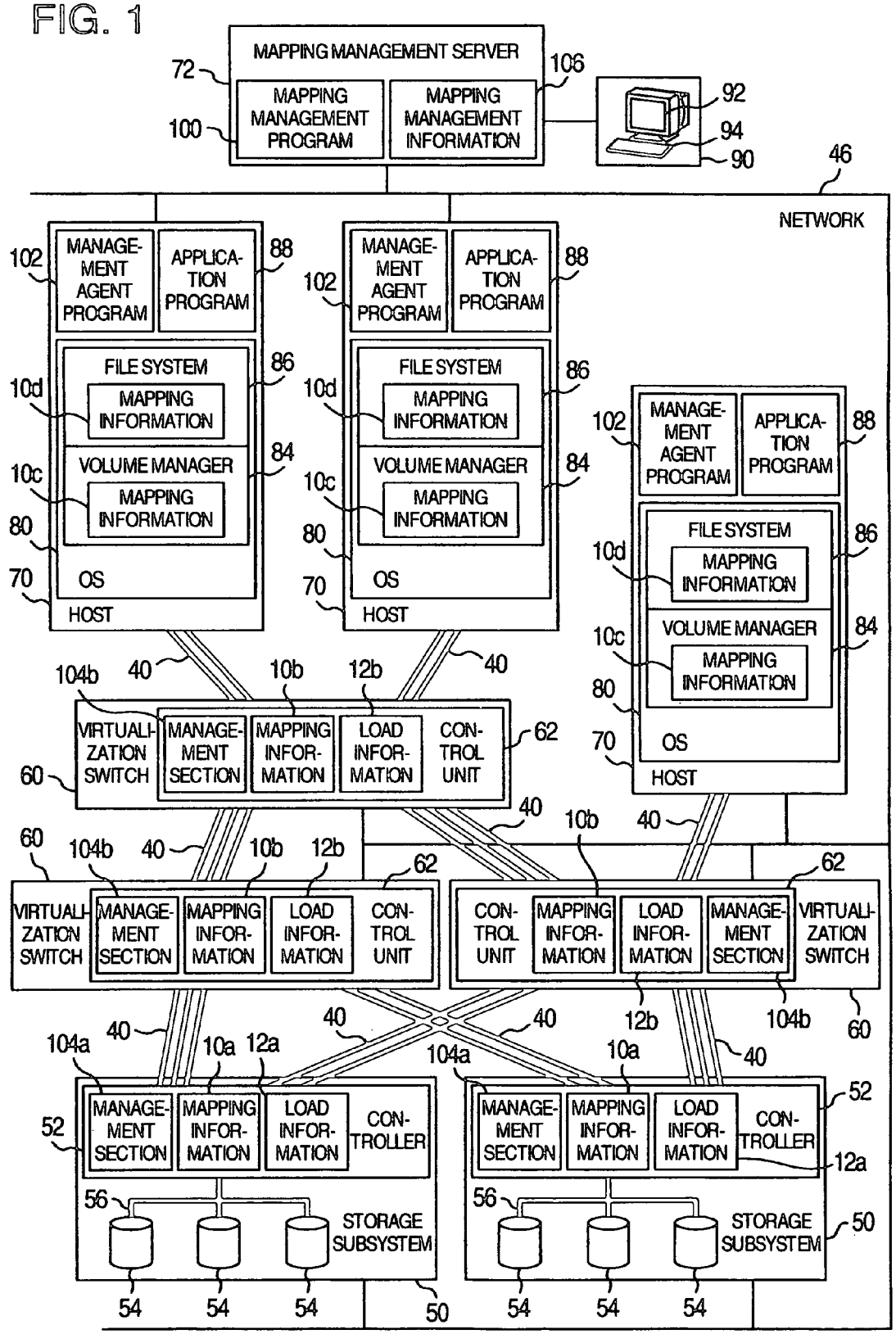
FIG. 1 is a diagram showing the construction of a computer system in an embodiment of the invention.

FIG. 1 is a diagram showing the system configuration of an embodiment of the computer system according to the invention. The computer system has computers (hereafter, referred to as "hosts") 70 using storage subsystem, a computer (hereafter, referred to as "data mapping management server") 72 for virtualization management, particularly for data mapping management, virtualization switches 60 for virtualization processing, and storage subsystems 50. These computers, server and storage subsystems are connected together by a network 46 to communicate each other.

The hosts 70, virtualization switches 60 and storage subsystem 50 are interconnected through communication lines (hereafter, referred to as "I/O paths") 40. The I/O processing between the hosts 70 and the storage subsystems 50 is made by use of I/O paths 40. The I/O paths 40 may be communication lines for transfer of data on different physical media and/or with different protocols between the apparatuses. The network 46 and I/O paths 40 may be the same communication lines.

The storage subsystem 50 has a controller 52 and disk drives 54. These devices are connected by an internal bus 56. The storage subsystem 50 also includes a storage subsystem formed of a plurality of disk drives 54 and controller 52. The controller 52 has a management section 104a, mapping information 10a, and load information 12a. The disk drives 54 may be a single one or a plurality of ones. The management section 104 has a central processing unit (CPU).

The storage subsystem 50 virtualizes the physical storage regions that the disk drives 54 have, and provides one or a plurality of logical disk drives 208 to external apparatus. The logical disk drives 208 provided may be one to one correspondence with the disk drives 54 or with the storage regions of a plurality of disk drives 54.

The management section 104a uses the mapping information 10a to control the address conversion between the logical disk drives 208 and the physical storage regions of the disk drives 54.

The mapping information 10a is the information showing the correspondence between the logical disk drives 208 and the physical storage regions of the disk drives 54.

The management section 104a measures the loads on particular ones of the logical disk drives 208 and disk drives 54. The load information 12a is the information showing the loads measured by the management section 104a.

In addition, the storage subsystem 50 transmits the mapping information 10a and load information 12a through the network 46 to other apparatus.

The management section 14a also receives a command from the external through the network 46, and according to this command, it dynamically changes the positions at which the data belonging to the logical disk drives 208 are stored in the disk drives 54. The "dynamical change" means that "the stored data positions are changed without interrupting the processing operation of the system." At this time, the management section 104a can make both the change of data stored positions accompanied by data copying and the change of only the mapping information 10a without data copying.

The management section 104a of storage subsystem 50 is not always necessary to collect the load information 12a. The management section 104a is not always necessary to dynamically change the data stored positions. The management section 104a is not necessary to alter only the mapping information 10a without copying.

The virtualization switch 60 has a control section 62. The control section 62 has a management section 104b, mapping information 10b and load information 12b.

The virtualization switch 60 uses the management section 104b to identify the logical disk drive 208 provided by the apparatus connected to the virtualization switch 60, and to provide other apparatus with a virtual volume 206 into which the storage region the identified logical disk drive 208 has is virtualized. When the virtualization switch 60 is connected to another virtualization switch 60, it identifies not only the logical disk drive 208 but also the virtual volume 206 that the other connected virtualization switch 60 provides, and provides other apparatus with the virtual volume 206 into which the identified virtual volume 206 and logical disk drive 208 are further virtualized.

The mapping information 10b has the information showing the correspondence between the virtual volume 206 and the logical disk drive 208 (or logical disk drive 208 and virtual volume 206). The management section 104b measures the loads on the logical disk drive 208 as a constituent element of the virtual volume 206 that the virtualization switch 60 provides other apparatus or on the virtual volume 206 fed from other virtualization switch 60. The load information 12b is the information showing the measured loads. The virtualization switch 60 also transfers the mapping information 10b and load information 12b through the network 46 to other apparatus.

In addition, the management section 104b dynamically changes, on a command from other apparatus, the positions at which the constituent elements of the virtual volume 206 provided by the virtualization switch 60 are stored. At this time, the management section 104b can make both the migration of data accompanied by data copying and the change of only the mapping information 10b without data copying.

The virtualization switch 60 does not always need to collect the load information 12b and dynamically change the data stored positions. The virtualization switch 60 also does not always need to change the mapping information 10b without data copying.

The host 70 has a CPU and a memory. The CPU executes an operating system (OS) 80, an application program 88, and other programs such as management agent program 102. The OS 80 includes a volume manager 84 and a file system 86. The OS 80 may hold a raw device mechanism capable of direct access to the storage regions of the virtual volume 206 or others through the same file I/O interface as the software interface to a file 202 from application program 88.

Although the host 70 has only one file system 86 as illustrated, the host 70 may have a plurality of file systems 86. The application program 88 is the program that uses the data stored in the storage regions provided by the storage subsystems 50.

The volume manager 84 is the program that the CPU of host 70 executes. This program is executed when the host 70 identifies the virtual volume 206 or logical disk drive 208 provided by other apparatus and provides the file system 86 or application program 88 with at least one virtual logical volume 204 produced by combining one or more storage regions belonging to those identified ones. These programs are installed in the host 70 by use of a network or a transportable recording medium.

The volume manager 84 has mapping information 10c showing the correspondence between the logical volume 204 and the virtual volume 206 or logical disk drive 208. The volume manager 84 may dynamically change the data stored positions.

The file system 86 is the program that is to be executed in the CPU so that the host 70 can identify the logical volume 204, virtual volume 206 or logical disk drive 208, and provide the application program 88 with the file 202 formed easy to use by taking out part of the storage regions belonging to those volumes or logical disk drives. The file system 86 holds mapping information 10d to manage the file 202. The file system 86 may have the function to dynamically change the data stored positions.

The storage subsystem 50, virtualization switch 60, volume manager 84 and file system 86 (hereafter, collectively referred to as "virtualization mechanism") have the function to dynamically create/delete the file 202, logical volume 204, virtual volume 206 and logical disk drive 208 (hereafter, collectively called "virtual structure") from the disk drive 54 plus the virtual structure (hereafter, collectively called "management structure"). Here, the "dynamically create/delete" means that the virtual structure is created or deleted without interrupting the operation of the computer system.

When the virtualization mechanism dynamically changes the data stored positions, and makes the alteration of the mapping information 10a, 10b, 10c and 10d without data copying, the virtualization mechanism can make the alteration of mapping information 10a and so on accompanied by the expansion/contraction of the storage regions that the virtual structure has. In addition, the virtualization mechanism, if necessary, can temporarily stop the I/O processing requested by the host 70.

The management agent program 102 is executed when the host 70 acquires the mapping information 10c, 10d that the volume manager 84 and file system 86 hold, and transmits it through the network 46 to the data mapping management server 72. This program is also executed when the commands received from the data mapping management server 72, such as the orders to dynamically alter the data mapping, create/delete the virtual structure and temporarily stop the I/O processing, are issued to the volume manager 84 or file system 86.

The data mapping management server 72 has a CPU and a memory. The memory holds a data mapping management program 100 and data mapping management information 106. The data mapping management server 72 is also connected through the network 46 to a management terminal 90 that has a display screen 92 and an input unit 94. The input unit 94 has a keyboard, mouse and the like. The connection between data mapping management server 72 and management terminal 90 may be an internal bus, and the display screen 92 and data mapping management server 72 may be integrally constructed.

The data mapping management program 100 is executed when the data mapping management server 72 manages the data mapping in the system of this invention. The data mapping management information 106 is necessary for the data mapping management server 72 to manage the data mapping. Specifically, the data mapping management information 106 includes mapping information 10a, 10b, 10c, 10d (hereafter, collectively called "mapping information 10") and load information 12a, 12b (hereafter, collectively called "load information 12") collected through management portions 104a, 104b, and the management agent program 102.

The data mapping management server 72 receives an interactive command from the administrator through the management terminal 90, and performs the processing associated with the alteration of data mapping. At this time, the server 72 causes necessary information to be indicated on the display screen 92. The command from the administrator is inputted through the input unit 94.

Although the server 72 is provided independently of other virtualization mechanism as in FIG. 1, an arbitrary virtualization mechanism may be used to act as the data mapping management server 72 in addition to its own role.

Figure 2:
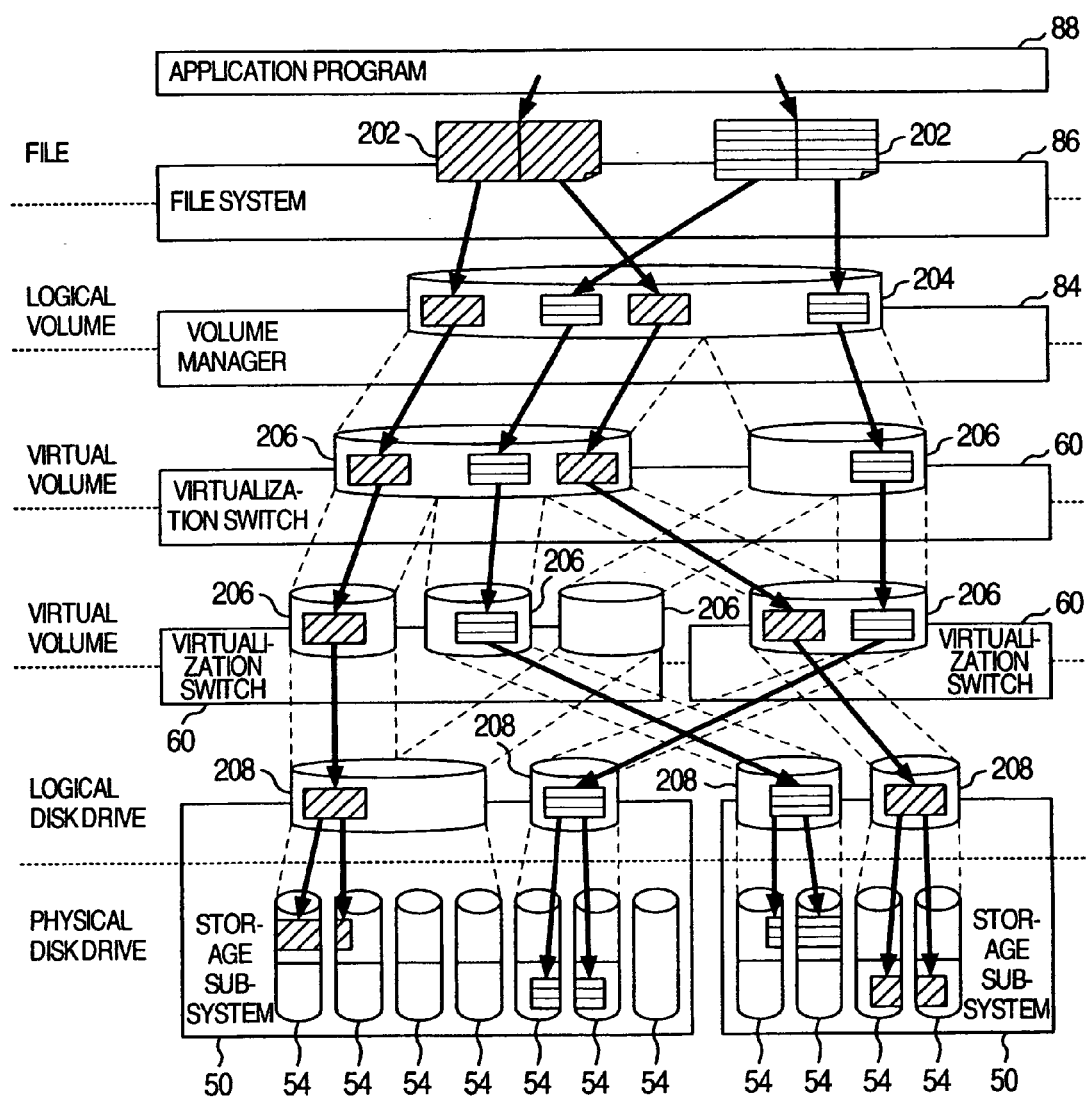
FIG. 2 is a diagram showing an idea of the hierarchical structure of data mapping in the embodiment of the invention.

FIG. 2 is a diagram showing the hierarchical structure of data mapping in the embodiment of the invention. With reference to FIG. 2, description will be made of the case where two virtualization switches 60 are hierarchically provided between the host 70 and storage subsystem 50. Hereafter, of the two hierarchical switches, one close to the application program 88 is called higher layer, and the other close to the disk drive 54 as lower layer.

The application program 88 makes access to the file 202 provided by the file system 86. The file system 86 secures a region to store data of file 202 within the logical volume 204, and converts the access to the file 202 to the access to the logical volume 204 corresponding to file 202. Specifically, the address of file 202 included in the received command is converted to the address of logical volume 204, and a command including that address is issued.

The volume manager 84 converts the access to the logical volume 204 to the access to the region of virtual volume 206 corresponding to the logical volume 204.

The virtualization switch 60 converts the access to the virtual volume 206 to the access to the logical disk drive 208 corresponding to the virtual volume 206 or to the access to the region of virtual volume 206. The storage subsystem 50 converts the access to the logical disk drive 208 to the access to the disk drive 54 corresponding to the logical disk drive 208.

Certain virtualized data may be shared by a plurality of hosts 70, though not shown. Data sharing can be performed when one storage region in the virtual volume 206 of the lower layer is referred to by the virtualization mechanism of a plurality of higher virtualization mechanisms (virtualization switches, etc.).

The virtualization switch 60 is not limited to two hierarchical switches, but may be an arbitrary number of hierarchical switches. Also, it can be considered that there are no file system 86 and volume manager 84 in host 70 or those are not used, there is no virtualization switch 60, or the storage subsystem 50 does not have function to make conversion between the logical and physical storage regions but provides the storage regions of disk drives 54 directly to the external. When the storage subsystem 50 does not have the function to covert between the logical and physical storage regions, it is not necessary to transmit the mapping information between the data mapping management server 72 and the storage subsystem 50, and thus the storage subsystem 50 does not need to be connected to the network 46.

FIG. 3 is a diagram showing the data structure of mapping information 10. The mapping information 10 has entries 302–310. The entry 302 has information indicative of higher virtual structure identifiers for virtual structure that the virtualization mechanism having the mapping table 10 provides to the higher layer.

The entry 304 has stored therein information indicative of higher intra-structure block numbers for the storage regions of the virtual structures corresponding to the higher virtual structure identifiers. The entry 306 has stored therein information indicative of lower virtualization function identifiers for the lower virtualization mechanisms that provides storage regions to the virtualization mechanisms having the mapping information 10. The entry 308 has stored therein information indicative of lower management structure identifiers for the management structures that are provided by the virtualization mechanisms corresponding to the lower virtualization function identifiers. The entry 310 has stored therein information indicative of lower intra-structure block numbers for the storage regions in the management structures corresponding to the lower management identifiers.

The virtualization mechanism identifiers used in the entry 306 of lower virtualization function identifiers or others are ones that can grasp the host 70 in which the virtualization mechanism is actually operated when the virtualization function is file system 86 or volume manager 84.

The entry 312 in which the higher virtual structure identifiers are "Free" indicates the storage regions of the lower apparatus which can be used by the virtualization mechanism having the mapping information but which are not provided to the virtualization mechanism of the higher apparatus. The virtualization mechanism can make data migration accompanied by copying to the "Free" lower storage regions.

FIG. 4 is a diagram showing the data structure of load information 12. The entries 306–310 are the same as those in the mapping information 10 mentioned above, and will not be described. The entry 314 has registered therein information of load information cumulative value associated with the load of access to the storage regions specified in the entries 306–310 and provided by the lower virtualization mechanisms.

The load information cumulative value is the cumulative value of information associated with load from a certain time point such as the number of times of access to a certain storage region, and the amount of data transfer from/to the storage region and the actual time in which the data access processing is performed.

The data mapping management information 106 that the data mapping management server 72 has includes mapping management information 321, load information collection table 322, and data mapping management setting information 323.

The data mapping management setting information 323 holds the information for making the data mapping management easy. For example, it holds the information for managing the disk drives 54 under the state in which they are grouped according to their performances or purposes.

Figure 5:
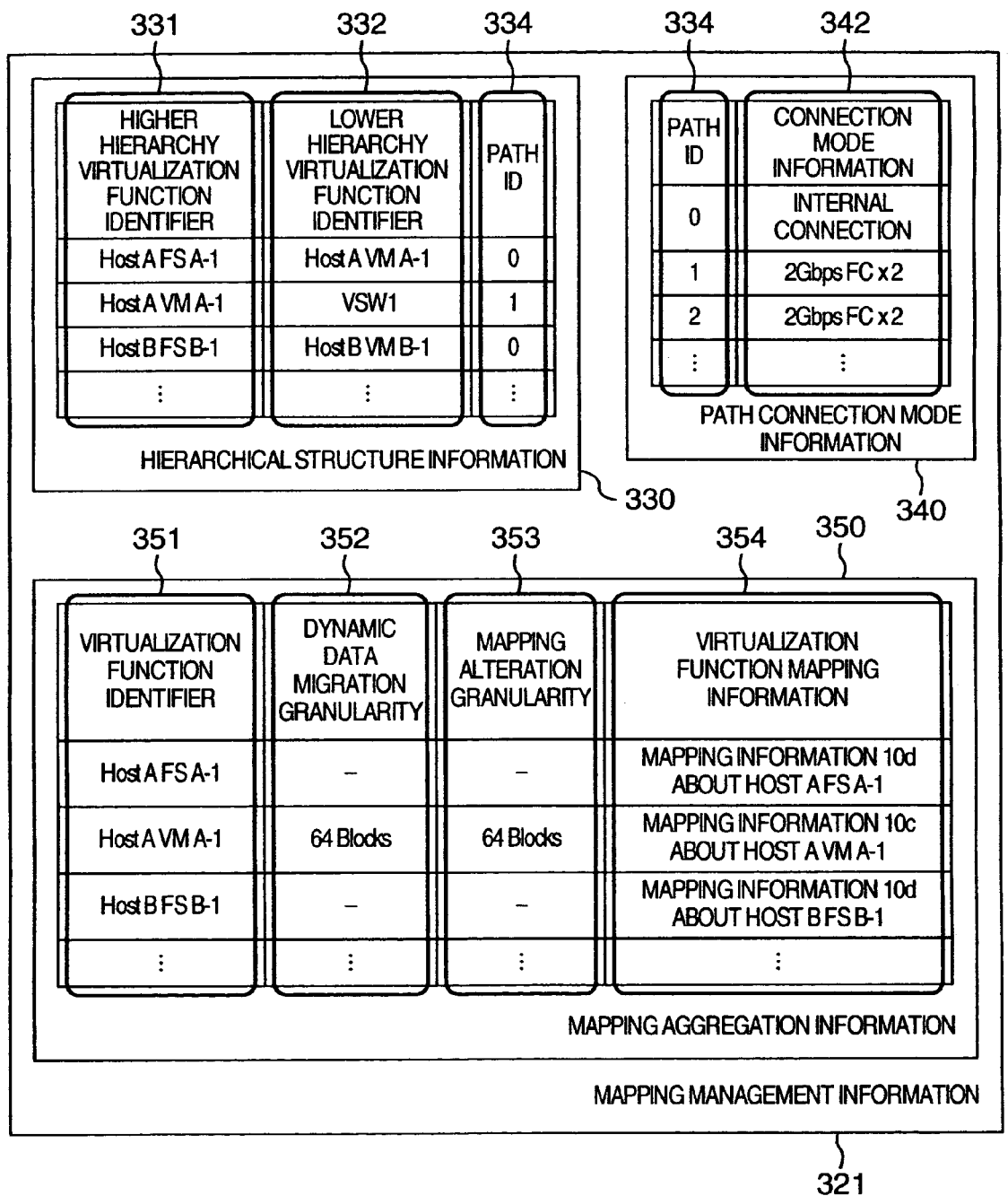
FIG. 5 is a diagram showing data structure of mapping management information 321.

FIG. 5 is a diagram showing the data structure of mapping management information 321. The mapping management information 321 includes hierarchical structure information 330, path connection mode information 340, and mapping aggregation information 350.

The hierarchical structure information 330 has stored therein the information about the use of virtual structures provided by the lower virtualization mechanisms. Specifically, it includes a set of higher virtualization function identifiers 331 for the higher virtualization mechanisms, lower virtualization function identifiers 332 for the lower virtualization mechanisms, and path ID 334 for I/O path 40 that is used when the higher apparatus makes access to the lower apparatus. In this embodiment, since there is no virtualization mechanism lower than the storage subsystem 50, there is no entry in which the virtualization mechanism specified by the higher virtualization function identifier 331 is the storage subsystem 50.

The path connection mode information 340 has registered therein the information about the path for use in the data transfer between virtualization mechanisms. Specifically, it holds a set of a path ID 334 as an identifier for I/O path 40, and connection mode information 342 of the transfer speed and connection mode of the path. Even a physically different, but equivalently used path is treated as one path. In addition, the access route between the file system 86 and volume manager 84 within the same host 70 can be considered as a path.

The mapping aggregation information 350 has collectively stored therein information related to data migration operation that the virtualization mechanisms make, and mapping information 10 that they hold. Specifically, it has stored therein a virtualization function identifier entry 351 in which identifiers for virtualization mechanisms are registered, a dynamic data migration granularity entry 352 in which there is register the information as to the minimum unit of data migrated when the virtualization mechanism can make data migration accompanied by data copying, a mapping alteration granularity entry 353 in which there is registered the information as to the minimum unit of data under mapping alteration when the virtualization mechanism makes the change of mapping information 10 without data copying, and a virtualization function mapping information entry 354 for holding the mapping information 10 collected from the virtualization mechanism.

The dynamic data migration granularity entry 352 and mapping alteration granularity entry 353 are held as null value when the virtualization mechanism corresponding to the entry cannot make the data migration.

FIG. 6 is a diagram showing the data structure of load information collection table 322 included in the data mapping management information 106. The load information collection table 322 includes the virtualization function identifier entry 351 in which the identifiers of the virtualization mechanisms for collecting the load information 12 are registered, the lower virtualization function identifier entry 306 in which the information about the lower storage regions of which the load information 12 are collected are registered, the lower management structure identifier entry 308, the lower intra-structure block number entry 310, an old load information cumulative value entry 364 for holding the load information cumulative value 314 of the corresponding region of which the load information 12 was previously collected, a load information collection value entry 365 for holding the load information of the corresponding region in a certain period, and a previous load information cumulative value acquisition time 366 indicative of the time at which the load information 12 was previously collected.

As described above, the storage subsystem 50 and virtualization switch 60 has the function to supply the load information 12 to the external apparatus. Thus, the data mapping management server 72 acquires the load information 12 from the virtualization mechanism through the network 46 at constant intervals of time, calculates the load information acquired during a period from time 366 to the current time on the basis of the load information cumulative value 314 resulting from accumulating the acquired information, old load information cumulative value 364, previous load information cumulative value acquisition time 366 and current information, and makes the calculated load information be stored in the regions corresponding to the load information collection value 365.

Then, the data mapping management server 72 causes the acquired load information cumulative value 314 to be stored in the corresponding old load information cumulative value entry 364, and the current time used in the calculation to be stored in the previous load information cumulative value acquisition time entry 366. The contents of the load information stored in the load information collection value entry 365 are different from those of the load information cumulative entry 314. For example, they can be considered to be the number of times of I/O per unit time, amount of data transfer per unit time and access time cumulative value per unit time.

All the storage subsystems 50 and virtualization switches 60 are not required to collect the load information 12. In this case, in the load information collection table 322 is registered only the information calculated from the collected load information 12. When any storage subsystem 50 or virtualization switch 60 does not collect the load information 12, the load information collection table 322 may be omitted.

The data mapping alteration processing according to the invention will be described below. The following processing operations are made: first the data migration processing accompanied by data copying, second the mapping alteration processing without data copying, and third the garbage collection (GC) processing for changing the data mapping in order to release the regions in which effective data is not held. It is assumed that a series of commands associated with the data mapping alteration processing are issued by the data mapping management server 72. In addition, even if the constructions of virtualization mechanisms and the number of apparatus in the hierarchical structure are different from those described below, the same operations as in the following description are performed.

Figure 7:
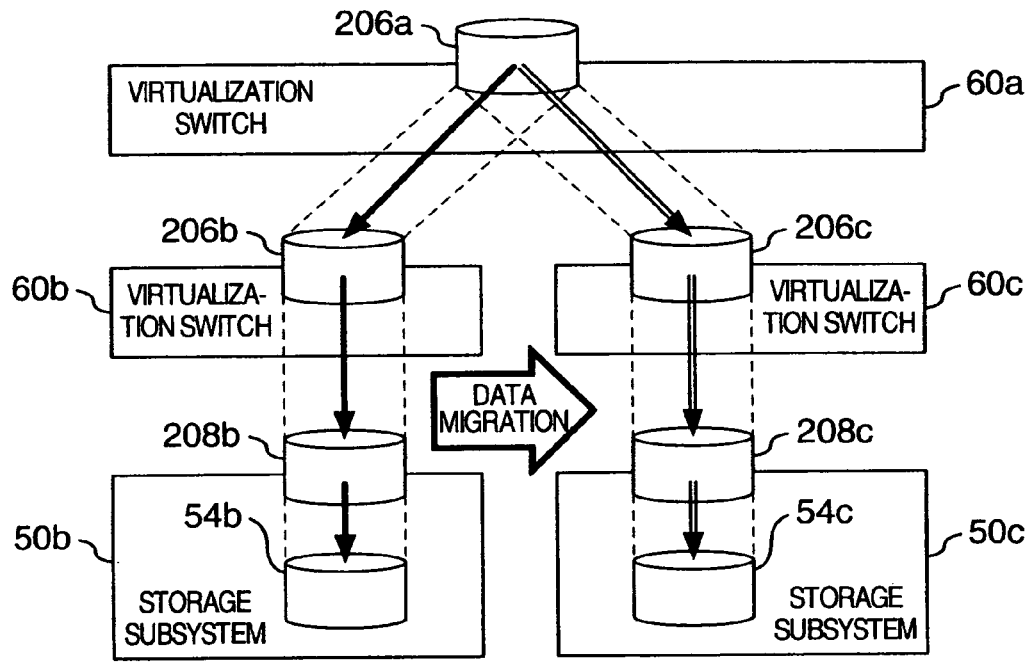
FIG. 7 is a diagram useful for explaining data migration processing that is accompanied by data copying.

FIG. 7 is a schematic diagram showing the data migration in the storage regions, accompanied by data copying. This figure shows an example of the mapping alteration in which the mapping of the virtual volume 206a constructed by a virtualization switch 60a to the lower apparatus is changed by data migration accompanied by copying.

Before the change of mapping, the data of virtual volume 206a is assigned to a virtual volume 206b provided by a virtualization switch 60b. In addition, the virtual volume 206b is assigned to a logical disk drive 208b constructed by a disk drive 54b of a storage subsystem 50b.

In this embodiment, when the data stored in the disk drive 54b is migrated to the disk drive 54c, the mapping of virtual volume 206a is changed so that this volume is assigned to a virtual volume 206c within a virtualization switch 60c.

When the virtual volume 206c is not present in the virtualization switch 60c at the time of mapping alteration, the virtual volume 206c is produced in the virtualization switch 60c. First, the data mapping management server 72 issues a command to the storage subsystem 50c, ordering it to produce a logical disk drive 208c from an available one of the storage regions that the disk drive 54c of the storage subsystem 50c has. Then, it issues a command for the virtualization switch 60c to identify the produced logical disk drive 208c.

Subsequently, the data mapping management server 72 issues a command to the virtualization switch 60c, ordering it to produce the virtual volume 206c by using the logical disk drive 208c. Thereafter, it issues a command to the virtualization switch 60a, ordering this switch to identify the virtual volume 206c, and then orders the virtualization switch 60a to make data migration accompanied by copying so that the storage region of the virtual volume 206a assigned within the virtual volume 206b is changed to the virtual volume 206c. The virtualization switch 60a, according to this order, reads out data from the storage subsystem 50b, and transfers the data to the storage subsystem 50c of which the mapping was changed. When a plurality of and highly hierarchical virtualization switches 60 are concerned with the mapping alteration, data transfer is made by the virtualization switches 60 having paths to both the mapping-changing and-changed storage subsystems 50.

Then, the data mapping management server 72 makes GC processing associated with the virtual volume 206b when other regions of the virtual volume 206b are used by other virtualization mechanism. When other regions of the virtual volume 206b are not used by other virtualization mechanism, the server orders the virtualization switch 60b to delete the virtual volume 206b.

The data mapping management server 72 also makes the entry corresponding to the virtual volume 206b deleted within the mapping information 10b of the virtualization switch 60b be kept in the "Free" state. Alternatively, it orders the virtualization switch 60b to stop the use of logical disk drive 208b, and then orders the storage subsystem 50b to delete the logical disk drive 208b.

When data to be migrated at the time of data migration accompanied by copying is shared by a plurality of virtualization mechanisms, a problem occurs with the data consistency being held by a plurality of access paths under data migration processing. In order to avoid this problem, at the data migration time, mapping alteration processing without copying is performed so that the data-sharing virtualization mechanisms can operate as higher apparatus than those under data migration. After the data migration is finished, mapping alteration processing without copying, if necessary, is carried out to return the data-sharing mechanisms to the original state.

When the storage regions of logical disk drive 208c are assigned as in FIG. 7, it is possible to use the storage regions within the disk drive 54 that correspond to those marked as "Free" in the mapping information 10 managed by other virtualization mechanism. In this case, the data mapping server 72 causes the associated virtualization mechanism and storage subsystem 50 to release the corresponding storage regions and assign the storage regions corresponding to the storage subsystem 50 to the logical disk drive 208c. The release of those regions is sometimes accompanied by GC processing.

Figure 8:
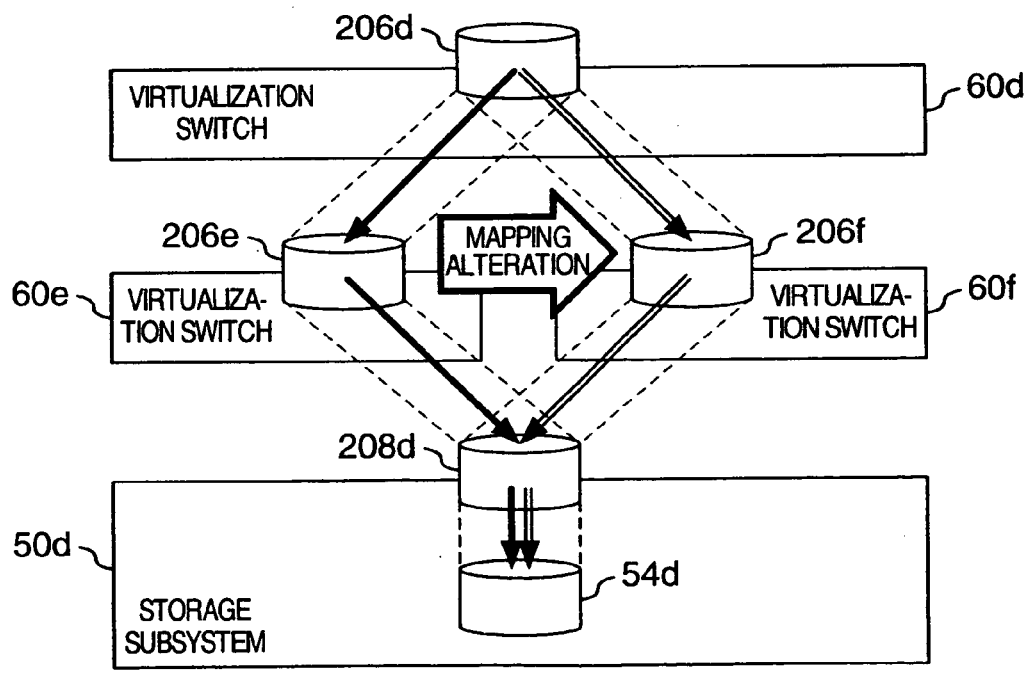
FIG. 8 is a diagram useful for explaining mapping alteration processing without data copying.

FIG. 8 is a diagram briefly showing the mapping alteration without data copying. As illustrated, the structure of a virtual volume 206d provided by a virtualization switch 60d is changed by the mapping alteration without copying.

Before the mapping alteration, the virtual volume 206d is mapped in a virtual volume 206e provided by a virtualization switch 60e. The virtual volume 206e is mapped in a logical disk drive 208d constructed by a disk drive 54d within a storage subsystem 50d. This state is changed to the mapping in a logical volume 206f within a virtualization switch 60f by the mapping alteration without copying.

First, the data mapping management server 72 searches for the mapping management information 321, and determines the region of logical disk drive 208d corresponding to the virtual volume 206d in the virtualization switch 60e in which the mapping is altered. The server 72 orders the virtualization switch 60f to produce a virtual volume 206f of the determined region of logical disk drive 208d. Then, the server 72 orders the virtual switch 60d to temporarily stop the I/O execution processing on the virtual volume 206d and change the assignment of the virtual volume 206d of virtual switch 60d that was assigned to the virtual volume 206e to the assignment to the virtual volume 206f, thus resuming the I/O execution processing on the virtual volume 206d.

Subsequently, when the virtual volume 206e goes into the state in which it is not used by other virtualization mechanisms at all, the server 72 orders the virtualization switch 60e to delete the entry corresponding to the virtual volume 206e. When there is a virtualization mechanism that still uses part of the virtual volume 206e, the server 72 makes GC processing on the virtual volume 206e.

Figure 9:
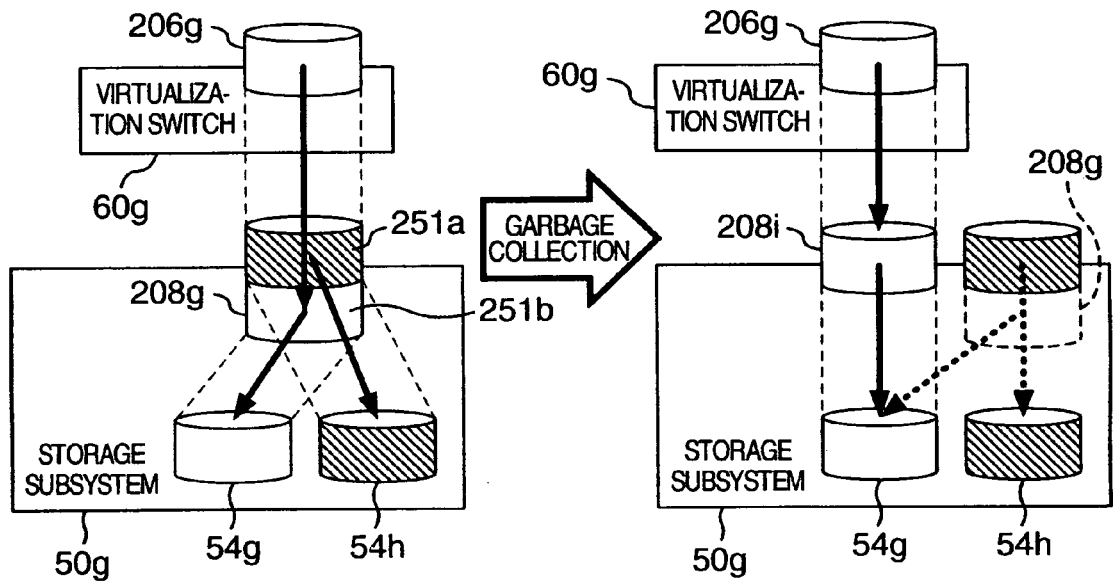
FIG. 9 is a diagram useful for explaining GC processing that is used to alter data mapping in order to release the region with no effective data held.

FIG. 9 is a diagram briefly showing the GC processing. The left part of the figure shows that a virtualization switch 60g produces a virtual volume 206g by using a region 251b of a logical disk drive 208g provided by a storage subsystem 50g. In addition, it shows that a region 251a within the same logical disk drive 208g is assigned to a disk drive 54h, and the region 251b to a disk drive 54g.

Here, it is assumed that the region 251a is not used by other virtualization mechanisms. In this case, since the logical disk drive 208g is provided to the virtualization switch 60g, there is the possibility that the region 251a is accessed by the virtualization switch 60g when the disk drive 54h corresponding to the region 251a is used by other virtualization mechanisms. The case opposite to that can be considered.

Thus, GC processing is performed to make the region 251a of logical disk drive 208g free. First, the server 72 obtains the region 251b.

When the virtualization mechanisms can make the mapping alteration without copying, the server 72 orders the storage subsystem 50g to produce a logical disk drive 208i formed of the region 251b. Then, it orders the virtualization switch 60g to make the mapping alteration without copying to produce the virtual volume 206g by using the logical disk drive 208i.

When the virtualization mechanism cannot make the mapping alteration without data copying, the server 72 first orders the storage subsystem 50g to generate the logical disk drive 208i of a region of the same size as the region 251b. Then, it orders the virtualization switch 60g to make data migration accompanied by copying so that the storage region of virtual volume 206g is changed to logical disk drive 208i. It further orders the storage subsystem 50g to make data migration accompanied by copying so that the storage region of logical disk drive 208i is changed to the original region 251b. The last mapping alteration within the storage subsystem 50g is not always necessary.

When the storage regions to undergo the GC processing are shared by a plurality of virtualization mechanisms, the shared data could cause a consistency problem due to the data migration accompanied by copying. At this time, when the same countermeasure as with the data migration accompanied by copying cannot be taken, such GC processing is not performed.

Figure 10:
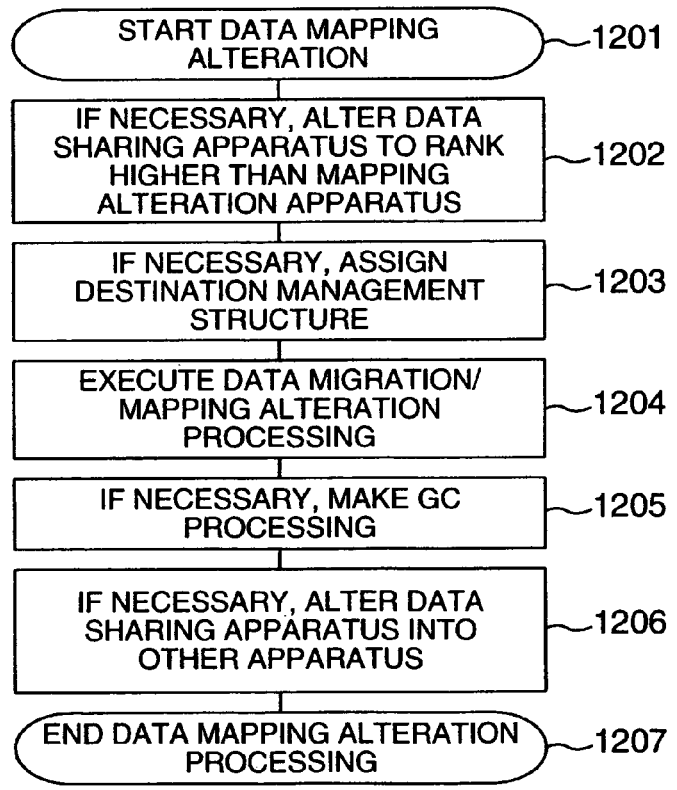
FIG. 10 is a flowchart for general mapping update processing.

FIG. 10 is a flowchart of the procedure for the mapping alteration. For the sake of simplifying the explanation, the processing for error is omitted in this procedure. If error occurs in the processing mentioned below, the mapping is restored to the original structure when possible. This processing is performed when the server 72 controls each virtualization mechanism.

First, to avoid the problem caused by data sharing, the server 72 orders so that, if necessary, the shared region is changed to the higher one than the region to undergo the mapping alteration. This is accomplished by the above-mentioned mapping alteration without copying (step 1202).

When the data migration accompanied by copying is performed as shown in FIG. 7, the assignment of a management structure to which data is migrated is made if necessary. The storage region marked "Free" in the mapping information 10 as described above may be used as a region to which data is migrated. In this case, GC processing is sometimes performed (step 1203).

Then, the server 72 instructs to make the data migration processing accompanied by copying and the mapping alteration processing without copying (step 1204).

In addition, GC processing is performed if necessary. At this time, when the mapping alteration processing accompanied by data migration is performed, data sharing is made in the higher region than the region in which data is migrated, and after the completion of data migration, data sharing in the original region is restored if necessary (step 1205).

Thereafter, if necessary, the region in which data sharing is made is migrated to a desired place by the mapping alteration without data copying (step 1206).

A description will be made of a view presented to the administrator when the data mapping alteration is performed. A view is displayed on the output screen 92 the management terminal 90 holds. The server 72 accepts through the input unit 94 an order that is issued from the administrator according to a view.

Various kinds of mapping information are displayed on the views. At this time, necessary mapping information is obtained by referring to data mapping management information 106 (particularly mapping management information 321) so that the associated portions are compared with each other. Even when other information such as setting functions is displayed, data mapping management information is referred to.

Figure 11:
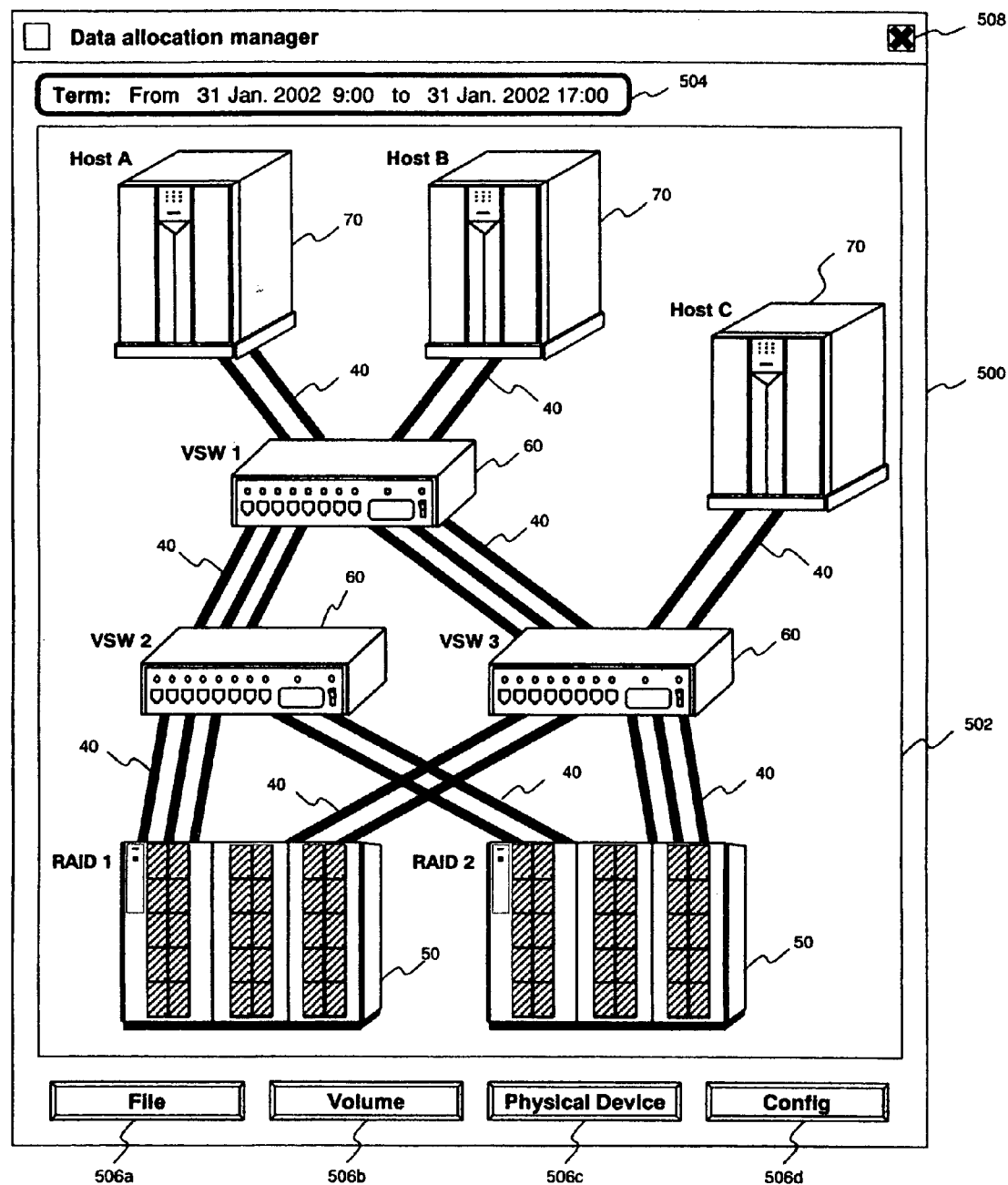
FIG. 11 is a diagram showing a management main view 500.

FIG. 11 shows a management main view 500, displayed on the output screen 92, of the computer system in which the server 72 manages the data mapping. In view 500, there are displayed a system configuration image box 502 in which the computer system image is displayed, a load information display period image box 504, a series of buttons 506 that are operated by placing the pointer thereon and clicking when various kinds of image boxes are tried to open, and a close button 508 for closing the management main view 500.

The management main view 500 is first displayed when the administrator makes data mapping alteration processing. The administrator, when finishing the processing, erases the view 500 from the screen by pushing the close button 508.

The system configuration image box 502 is the display region for the configuration of the computer system in which the server 72 manages the data mapping. When the administrator selects any one of the pictures of storage subsystems 50, virtualization switches 60 and hosts 70 by using the pointer on the screen (for example, double click the mouse), information associated with the selected apparatus, such as information within the load information collection table 322 corresponding to the selected apparatus, is displayed on the screen 92.

When the storage subsystems 50 and virtualization switches 60 are collecting load information 12, the server 72 refers to the mapping management information 321 and gathers up the load information about the virtual volume 206, logical disk drive 208, disk drive 54 and I/O path 40 that were collected during the period displayed on the load information display period box 504 to produce the data corresponding to that of the load information collection table 322.

When there is an apparatus of which the load information exceeds over a certain threshold, the server 72 lets the administrator perceive the high load portion by using means for changing, for example, the colour of the picture corresponding to that apparatus.

When the administrator selects a button 506a by the pointer, a file system browse view 510, which will be described later, is displayed on the screen 92. If a button 506b is selected, a virtual storage region browse view 520, which will be described later, is displayed on the screen 92. If a button 506c is selected, a physical storage drive browse view 540 which will be described later is displayed on the screen 92. If a button 506d is selected the view through which the administrator can change settings such as the load information display period 504, grouping to make the management of disk drives 54 easy is displayed on the screen 92.

Figure 12:
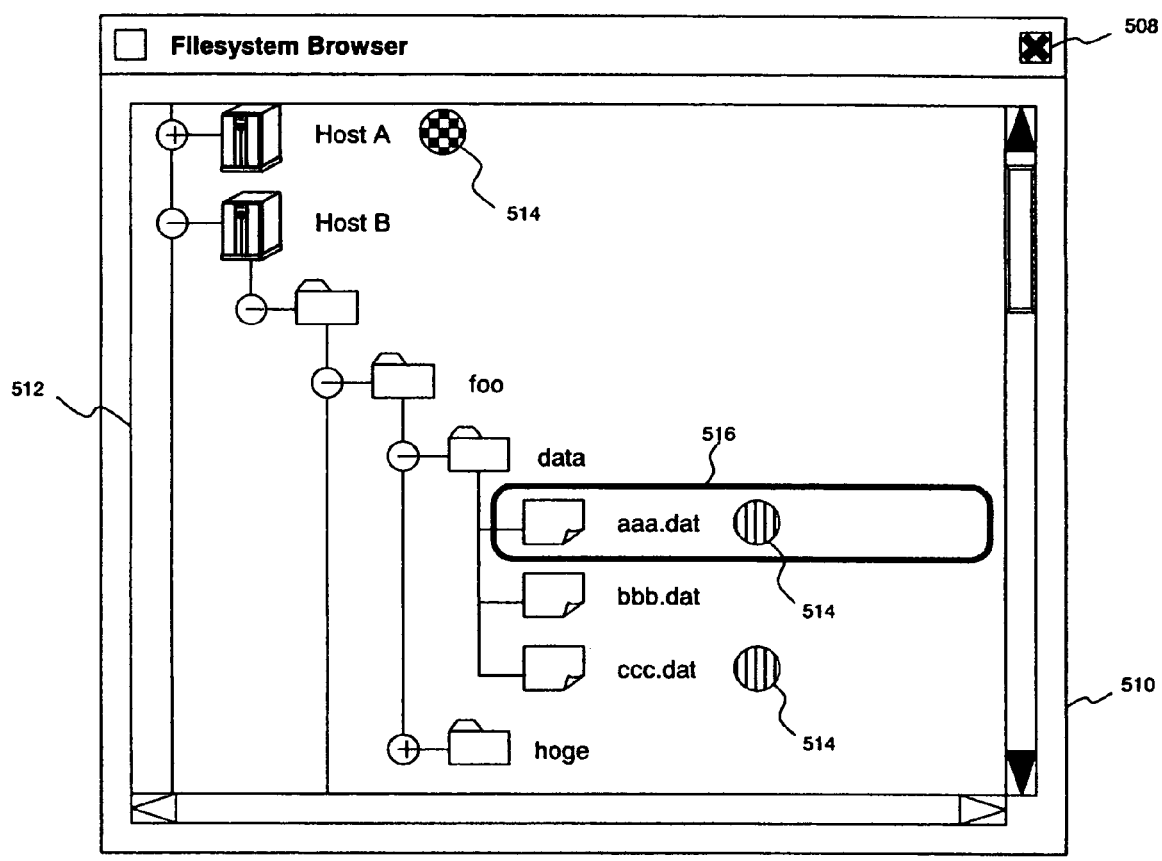
FIG. 12 is a diagram showing a file system browse view 510.

FIG. 12 is a diagram showing the file system browse view 510 that lets the administrator know the directory structure that a file system 78 in the computer system manages. The file system browse view 510 includes a file system browse region box 512 for indicating the directory structure, and the close button 508 that is selected when the file system browse view 510 is erased from the screen.

The file system browse region box 512 has tree-directory structures of each of hosts 70 displayed. It has scroll bars added to select for other data regions by the pointer. When the administrator selects (double click) the entry 516 displayed in the file system browse region box 512 by the pointer, the detailed information of the corresponding file 202 is displayed on the screen 92.

A mark 514 indicates that the corresponding entry 516 meets the conditions associated with a certain virtualization mechanism or management structure. This mark is used in the virtual storage region browse view 520 and physical storage drive browse view 540. The information relating to mark 514 is stored in the data mapping management setting information 323. The server 72 refers to the mapping management information 321, determines the management structure that satisfies that condition, and makes the mark 514 be displayed. When the conditions associated with the mark are different from each other, the color and design of the mark 514 are changed. A plurality of marks 514 are sometimes displayed in the same entry as a characteristic of the mark 514.

The setting of the mark 514 that indicates that it has a particular file, for example, the above file 202 is made when the administrator selects the entry 516 corresponding to the file 202 by the pointer (clicking the right button of the mouse at that position) to make a menu be displayed on the screen, and selects the "mark setting" on the menu. Similarly, the setting of mark 514 that indicates that it is accessed by host 70 can be made on the file system browse region box 512.

Figure 13:
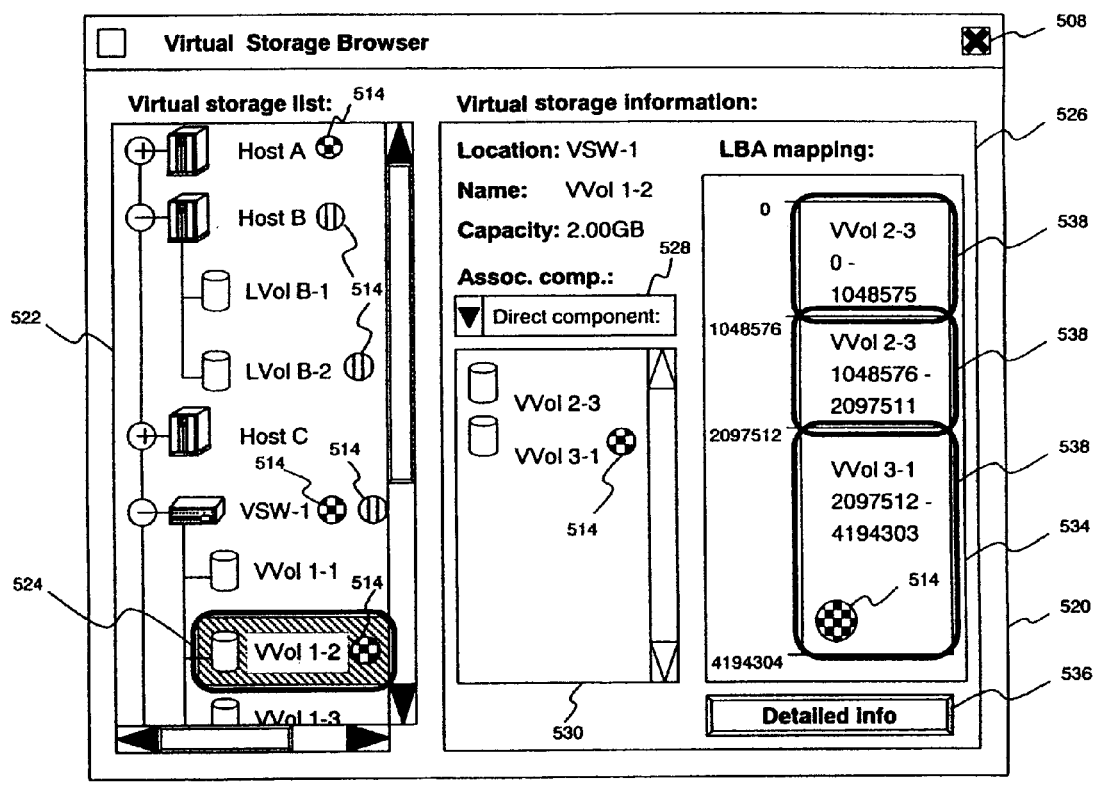
FIG. 13 is a diagram showing a virtual storage region browse view 520.

FIG. 13 is a diagram showing the virtual storage region browse view 520 including the logical volume 202, virtual volume 204 and logical disk drive 206 that are present within the computer system.

The virtual storage browse view 520 includes a logical storage region browse region box 522, a logical storage region information display region box 526 and the close button 508 that the administrator uses when erasing the virtual storage region browse view 520 from the screen. On the screen 92, there can be displayed a plurality of browse views 520 at the same time.

The logical storage region browse region box 522 has scroll bars added to select other data regions by the pointer. In the browse region box 522, there are displayed the logical volume 204, virtual volume 206 and logical disk drive 208 that are present within the computer system in a group manner for each virtualization mechanism. When the administrator selects (clicks) the displayed entry 524 by the pointer, the logic volume 204, virtual volume 206 and logical disk drive 208 are displayed in the logical storage region information display region box 526 corresponding to the entry. The mark 514 is also used for the entry 524. In addition, the method for the setting of mark 514 is the same as in the above.

The information of the selected logical volume 204, virtual volume 206 and logical disk drive 208 is displayed in the region box 526. Specifically, there are displayed the name of the virtualization mechanism that provides the selected logical volume and so on, the names of the selected logical volume and so on and its storage capacity, an associated management structure display selection region box 528, an associated management structure name list display region box 530, a logical block mapping display region box 534 and a detailed information display button 536.

The administrator selects, from the displayed associated management structure display selection region box 528, the type of the associated management structure displayed on the associated management structure name list display region box 530 and logical block address mapping display region box 534. The associated management structure indicates a management structure that uses directly or indirectly the storage region provided by a specified management structure and a management structure that directly or indirectly provides the storage region to a specified management structure.

The administrator selects, from the displayed associated management structure display selection region box 528, the type of the associated management structure displayed on the associated management structure name list display region box 530 and logical block address mapping display region box 534. The associated management structure indicates a management structure that uses directly or indirectly the storage region provided by a specified managment structure and a management structure that directly or indirectly provides the storage region to a specified management structure.

For example, when the administrator selects (clicks) this region box 528, there is displayed a list of the types of associated management structures such as "management structure as direct constituent element", "highest logical volume" and "physical storage region". The administrator selects (clicks) an entry from the list, thereby specifying a management structure that is desired to display.

The associated management structure name list display region box 530 includes a list of the names of management structure selected on the region box 528. The display region box 530 has also scroll bars added for other data regions. The mark 514 is also added to the entry displayed on the list display region 530 according to the contents of data held by the storage region corresponding to the entry.

The logical block address mapping display region box 534 has associated management structure matching region boxes 538 displayed in a divided manner to indicate the correspondence between the storage regions within the management structure of which the information is displayed and the data of portions of the associated management structure of the type selected on the selection region box 528. The region boxes 538 also have the mark 514 added according to the contents of the data held. In addition, the mark 514 can be set in the same way as above. There is also displayed the corresponding region information if it can be displayed directly with letters. At this time, information about a region to which a copy of data can be migrated and which corresponds to an available management structure is also displayed.

When the button 536 is selected on the screen, there are displayed detailed information such as the processes assigned to the management structure of synchronous data copy function or the like, load information within the load information collection table 322, and the same high-resolution information as the logical block address mapping display region 534 in association with the logical volume and so on currently displayed on the logical storage region information display region box 526.

Figure 14:
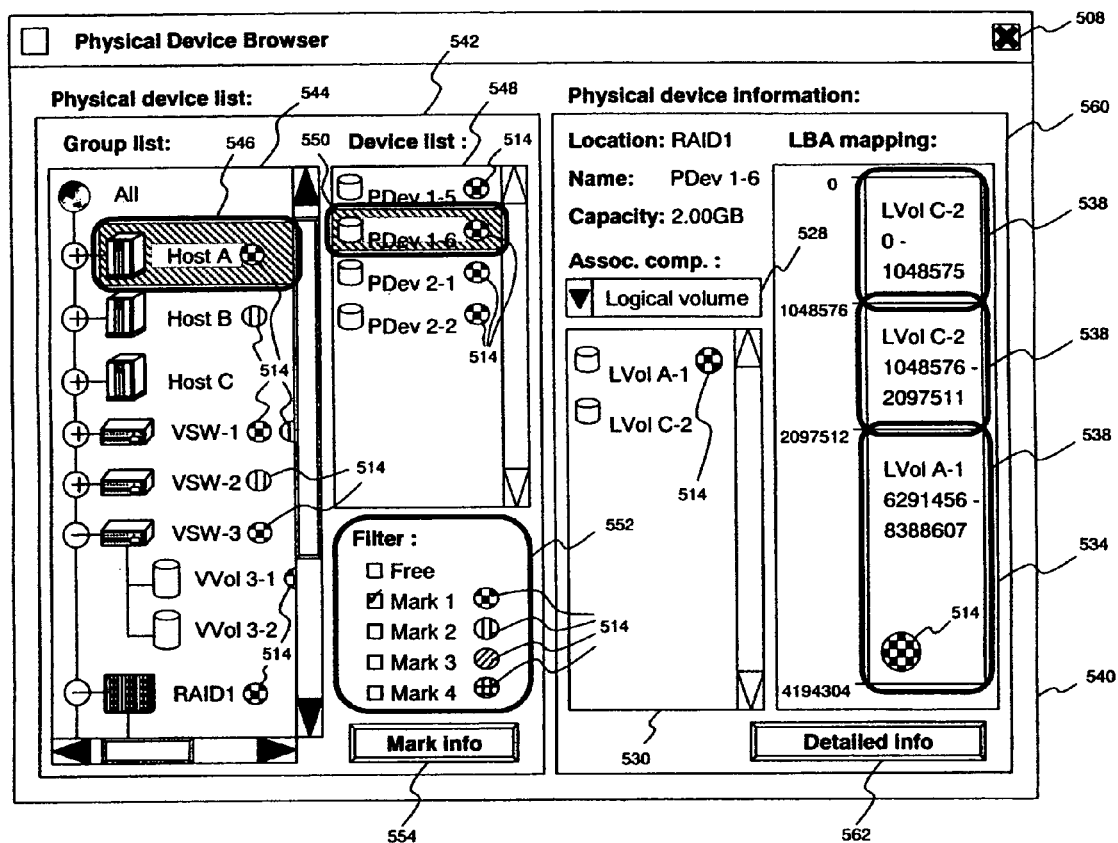
FIG. 14 is a diagram showing a physical storage subsystem browse view 540.

FIG. 14 is a diagram showing the physical storage subsystem browse view 540 which is displayed on the screen 92 and which includes the picture of disk drives 54 that exist in the computer system. The physical storage subsystem browse view 540 has a physical storage drive browse box 542, a physical storage drive information display box 560, and the close button 508 that is used to erase the browse view 540. A plurality of browse views 540 can be displayed on the screen 92 at the same time.

The physical storage drive browse box 542 is opened to display the disk drives that exist in the system, and includes a group list display box 544, a physical storage drive list display box 548, a filter setting box 552, and a mark information display button 554.

The group list display box 544 has scroll bars added for displaying other data regions. The group list display box 544 has images of whole system, hosts 70, virtualization switches 60, storage subsystems 50, logical volume 204, virtual volume 206, logical disk drive 208, and groups set for management. At this time, the logical volume 204, virtual volume 206 and logical disk drive 208 are grouped for each of the virtualization mechanisms that provide those. The constituent elements of each group are displayed as subentries thereof. When the entry 546 displayed in the group list display box 544 is selected (clicked) on the screen, the list of the disk drives 54 included in the group corresponding to the entry 546, after the filter processing according to the settings displayed on the filter setting box 552, is displayed in the physical storage drive list display box 548. The entry 546 is also added with mark 514 when holding the corresponding data.

In the display box 548 is displayed the list of the names of disk drives 54 obtained by the above method. This box also has scroll bars added for the display of other data. When an entry 550 displayed in the display box 548 is selected, the corresponding information of disk drives 54 is displayed in the display box 560. The entry 550 also has mark 514 added according to the data that it has.

The filter setting box 552 is used to specify the filter processing that is performed when the list of disk drives 54 is displayed in the display box 548. When the "Free" entry check box is check-marked, only the disk drive 54 including the region corresponding to the entry marked "Free" is selected in the mapping information 10 of any virtualization mechanism when the filter processing is performed. When an entry check box of Mark 1, Mark 2, Mark 3, Mark 4 is checked, only the disk drive 54 including the data that satisfies the condition identified by the mark 514 on the side is selected by the filter processing. When a plurality of entries are checked, only the disk drive 54 that satisfies all the entries checked is selected by the filter processing.

When the button 554 is selected, the condition under which any one of all the marks 514 is added is displayed on the screen. A shortcut operation may be allotted on another display view to perform this operation.

The setting of mark 514 which means including data associated with disk drives 54 is performed by the same method as described above. The setting of mark 514 that means including data associated with logical volume 204, virtual volume 206, logical disk drive 208, host 70, virtualization switch 60 or storage subsystem 50 can also be similarly carried out in the group list display box 544.

In the box 560 is displayed information of selected disk drive 54. Specifically, this information includes the name of storage subsystem 50 that holds the selected disk drive 54, the name and capacity of the selected disk drive 54, the associated management structure display selection box 528, the associated management structure name list display box 530, the logical block mapping display box 534, and a detailed information display button 562.

When the button 562 is selected, detailed information about disk drive 54 currently displayed in the logical storage region information display box 526 is displayed that includes functions assigned to the regions of management structure such as function of synchronous data copy, load information within the load information collection table 322 associated therewith, and high-resolution information same as the logical block address mapping display box 534.

The data mapping alteration is ordered to make by using the virtual storage region browse view 520 and physical storage drive browse view 540 as follows.

The data to be migrated is specified by the associated management structure matching region box 538 displayed in the logical block address mapping display box 534. The destination of the data mapping alteration is indicated by drag and drop operation on the image corresponding to the data to which the mapping alteration is made.

At this time, a plurality of the associated management structure matching boxes 538 are selected with a proper key on the keyboard kept pressed, thereby making it possible to achieve the function to select a plurality of boxes 538 at a time, and at the same time to indicate the mapping alteration destination as a set.

The available mapping alteration destinations are as follows. The first one is the entry 550 within the physical storage drive list display box 548 in the physical storage drive browse view 540 or other associated management structure matching box 538 displayed in the logical block mapping display box 534 within the physical storage drive information display box 560. In this case, data is migrated to the region of the disk drive 54 corresponding to the specified entry 550 or to the disk drive 54 corresponding to the associated management structure matching box 538.

The second one is the entry 524 within the logical storage region browse box 522 in the virtual storage region browse box 520, other associated management structure matching box 538 displayed in the logical block mapping display box 534 within the logical storage region information display box 526 or the entry 546 within the group list display box 544 in the physical storage drive browse view 540. In this case, data migration is specified in the hierarchical structure of mapping described on a conceptual basis with reference to FIG. 2 so that mapping is performed in the specified virtualization mechanism, management structure or the corresponding region within the management structure.

In association with the order to alter the mapping, the menu displayed when the associated management structure matching box 538 is selected by clicking the right button of the mouse includes the following items.

The first one is the "Dividing" process for dividing the associated management structure matching box 538. This process can be performed only when the virtualization mechanism for providing the selected associated management structure matching box 538 supports the dynamic division of management structure. If this one is selected, an image box is displayed that is used to specify how the selected box 538 is divided. When an order to divide is selected in the displayed image box, an instruction is issued to actually execute the division to the virtualization mechanism. After successful execution of the instruction, the box 538 is displayed in a divided state. The mapping alteration of only an arbitrary partial region can be performed by this dividing process.

The second one is the item for ordering the data mapping alteration of the selected matching box 538 on the box-538 related mapping view. If this item is selected, the data mapping alteration view 580 is displayed.

Figure 15:
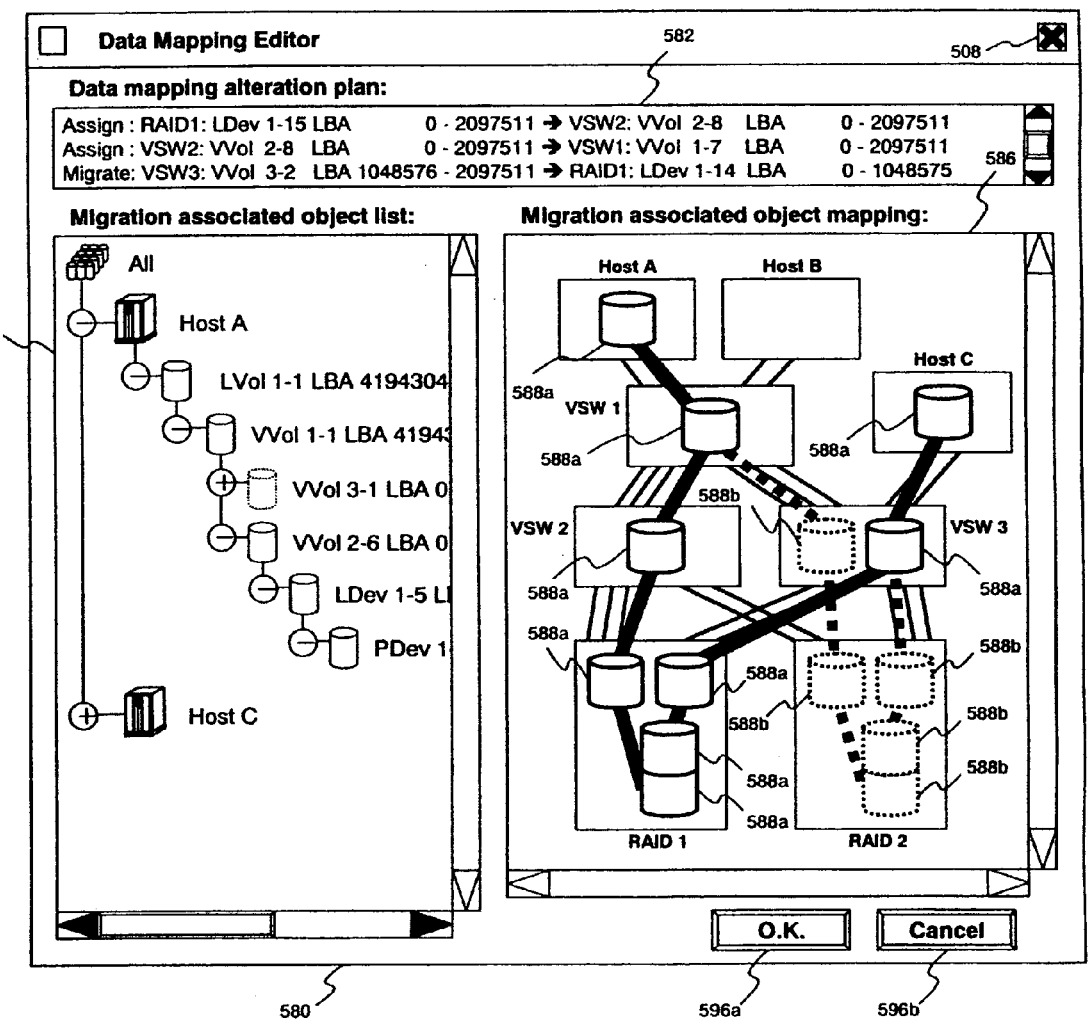
FIG. 15 is a diagram showing a data mapping alteration view 580.

FIG. 15 is a diagram showing the data mapping alteration view 580 displayed on the output screen 92. This view is used to display a data mapping alteration plan produced by the data mapping management server 72 or order to alter the mapping on the box-538 related data mapping view.

The data mapping alteration view 580 has a data mapping alteration procedure plan box 582, a data mapping alteration associated management structure browse box 584, a data mapping alteration edition box 586, the close button 508 to be selected when the view 580 is erased, a button 596a to be selected when the data mapping alteration is ordered to proceed, and a button 596b to be selected when the alteration processing is order to stop.

The data mapping alteration procedure plan box 582 has procedure plans provided in the order of execution for making the data mapping alteration displayed in the data mapping alteration edition box 586. The box 582 also has scroll bars added for displaying other data. When the data mapping procedure cannot be generated, the information that tells the failure of a procedure generator is displayed. Each time the data mapping is modified, a procedure for achieving the specified data mapping by the mapping alteration processing is displayed in the procedure plan box 582.

The procedures are obtained as follows.

First, the server 72 checks to see if the specified mapping structure could be realized by the procedure of only the mapping alteration without copying in each virtualization mechanism. Specifically, as to the portion of which the mapping structure differs before and after the alteration, it is confirmed if the management structure corresponding to the mapping after the alteration can be created and if the mapping alteration without copying can be performed by a virtualization mechanism in which the mapping is branched off by alteration.

When the storage regions on the disk drive 54 are changed after the mapping alteration, it is checked to see if the mapping can be achieved by the procedure including the data migration accompanied by copying. Specifically, as to the portion of which the mapping structure differs before and after the alteration, it is checked to see if the management structure corresponding to the mapping after the alteration can be created to correspond to the storage region on the disk drive 54 that is assigned for copy destination and if the structure can be attained by the data migration accompanied by copying on the virtualization mechanism in which the mapping is branched off. The mapping alteration procedure produced at that time is as described previously. It also includes the mapping alteration procedure for GC processing.

Here, you should pay attention to the data sharing process for making the data migration accompanied by copying. As described above, it is necessary to once share data by higher apparatus than the apparatus that makes the data migration accompanied by copying. If higher apparatus cannot share data, the specified data mapping is decided to be impossible.

Granularity is also considered when the mapping alteration is actually performed with reference to the mapping management information 321.

In addition, there is the possibility that the regions to be altered for their mapping are separated into a plurality of management structures in different apparatus. In this case, the above confirmation conditions are necessary to meet all the associated management structures.

The data mapping alteration associated management structure browse box 584 has scroll bars added for other data displaying. In the browse box 584, regions of management structure associated with the data mapping alteration displayed in the data mapping alteration edition box 586 are displayed in a mapping tree structure of logical volume 204 existing in the host 70. When the corresponding entry displayed is selected, an image of detailed information about the associated regions is displayed.

The edition box 586 has scroll bars added for other data displaying. In the edition box 586, the data mapping structures before and after the alteration related with the associated management structure matching box 538 are displayed by using icons 588*a* indicating the associated regions of management structure after the mapping alteration, and icons 588*b* indicating the associated regions of management structure before the mapping alteration.

The administrator makes drag-and-drop operation on the icon 588*a* to move it to a proper place in the editing box 586, thus ordering so that this mapping can be altered to the mapping that passes other virtualization mechanism. The data arrangement alteration in the disk drive 54 is made by the drag-and-drop of icon 588*a* corresponding to disk drive 54 to move it to the entry 550 within the physical storage drive list display box 548 of the browse view 540 or other associated management structure matching box 538 displayed in the box 534 of the physical storage drive information display box 560. When the icon 588*a*, 588*b* is selected (double clicked), the physical storage drive browse view 540 that displays the information of the disk drive 54 corresponding to the selected icon 588*a*, 588*b* is displayed on the screen 92.

Figure 16:
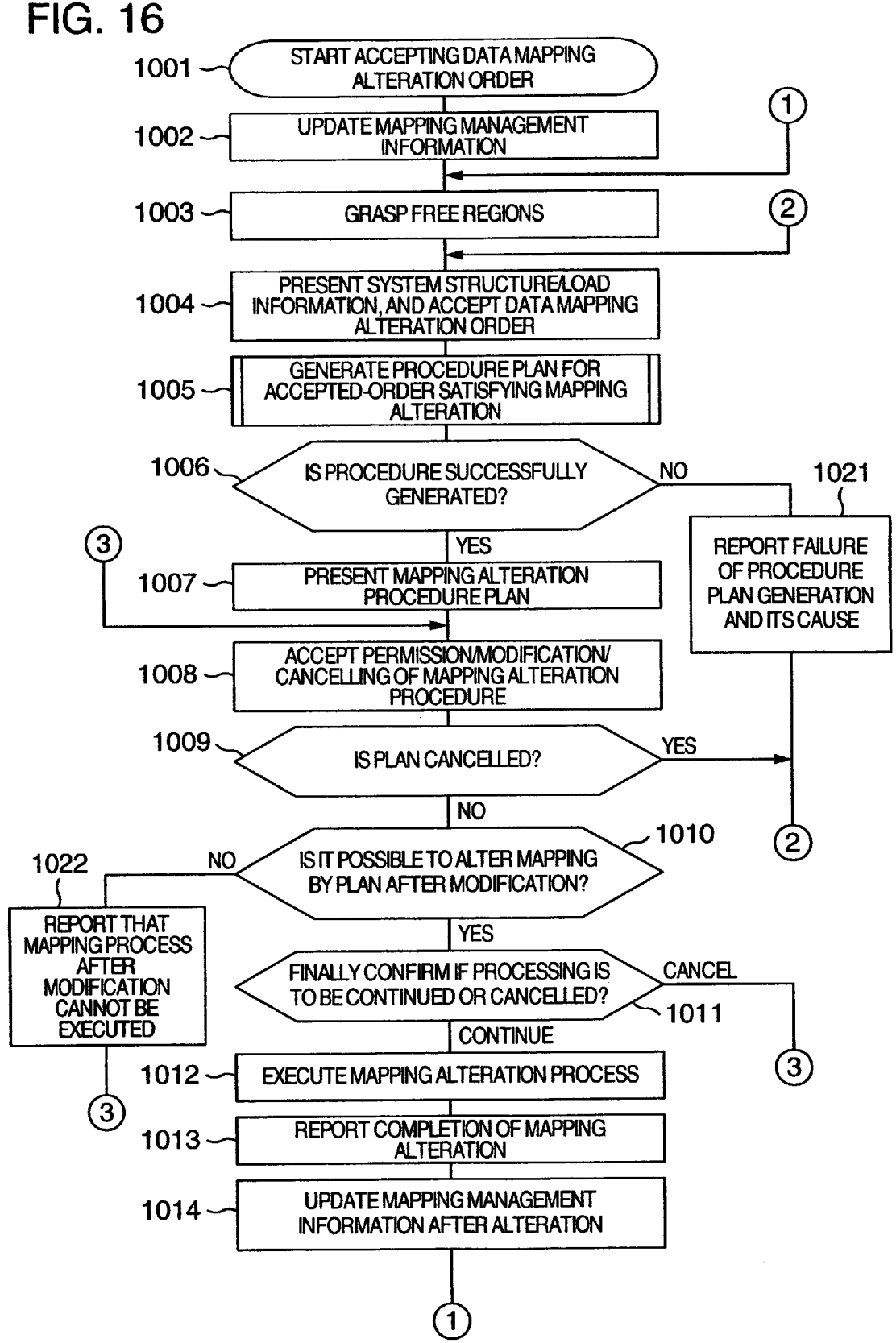
FIG. 16 is a flowchart for the basic procedure of data mapping alteration processing.

FIG. 16 is a flowchart showing the procedure of data mapping alteration that the administrator makes interactively with the server 72 through the management terminal 90. The processing shown in FIG. 16 is interrupted when the close button 508 within the management main view 500 is selected excepting that the processing is executed as shown at step 1012.

The administrator makes the data mapping alteration be started (step 1001). The server 72 collects mapping information 10 for the execution of this processing, and updates the mapping management information 321 into the latest information (step 1002).

The server 72 decides, by referring to the information 321, which storage region of which disk drive 54 is an available region for the data migration alteration accompanied by copying, and produces that information. That is, the server 72 refers to the virtualization function mapping information 354, grasps the data-copy available region in each virtualization mechanism, and confirms which region of which disk drive 54 corresponds to it (step 1003).

The server 72 provides the system configuration and load information to the administrator through the management terminal 90, and accepts the request for data mapping alteration. This process is executed by use of management main view 500, file browse view 510, virtual storage region browse view 520 and physical storage drive browse view 540. The details of this process are omitted since those views were described previously. There is a case where the data mapping alteration display view 580 is opened from the associated management structure-matching box 538. In that case, it is decided that data mapping without alteration has been specified, and the process of step 1005 is performed (step 1004).

The server 72 makes the process for producing the procedure of data mapping alteration that satisfies the data mapping specified at step 1004. When data mapping without alteration is specified, the process is considered to be successful with the result of no procedure generated (step 1005). The server 72 confirms if the data mapping alteration procedure plan has been successfully produced (step 1006). If this operation fails, the server 72 informs the administrator of the failure and its cause, and goes back to the process at step 1004 (step 1021).

If it is successful, the server 72 presents the data mapping alteration procedure plan produced at the step 1005 on the data mapping alteration display view 580, calling the administrator's attention to that view (step 1007).

Then, the server 72 accepts the permission/modification/cancelling of the produced data mapping alteration procedure by using the data mapping alteration view 580. The detailed contents are as in the description of data mapping alteration view 580 (step 1008).

It is checked to see if the request accepted at step 1008 is cancelling, that is, if button 596b is selected on the view 580. If it is cancelling, the processing goes to step 1004 (step 1009).

If it is not cancelling, the server 72 checks to see if the data mapping alteration is possible by confirming if the procedure for making the specified data mapping can be produced. The contents displayed in the mapping alteration procedure plan box 582 are checked for this decision (step 1010).

If the data mapping cannot be altered, the server 72 informs the administrator of the fact that the data mapping after modification cannot be achieved, and then goes back to the process of step 1008 (step 1022).

If the data mapping can be altered, the server 72 makes the final checking of if it is sure that the data mapping alteration is executed according to the data mapping alteration procedure currently displayed in the data mapping alteration view 580 (step 1011). If the alteration is cancelled, the server 72 goes back to step 1008.

When the data mapping alteration is selected to execute, the server 72 performs the data mapping alteration according to the produced procedure. Specifically, it sends the order to alter the data mapping according to the procedure to each virtualization mechanism (step 1012). After the completion, the server 72 informs the administrator that the process has been completed successfully or unsuccessfully through the terminal 90 (step 1013), updates the mapping management information 321 to be the structure after the alteration process completion, and goes back to the step 1003 (step 1014).

Figure 17:
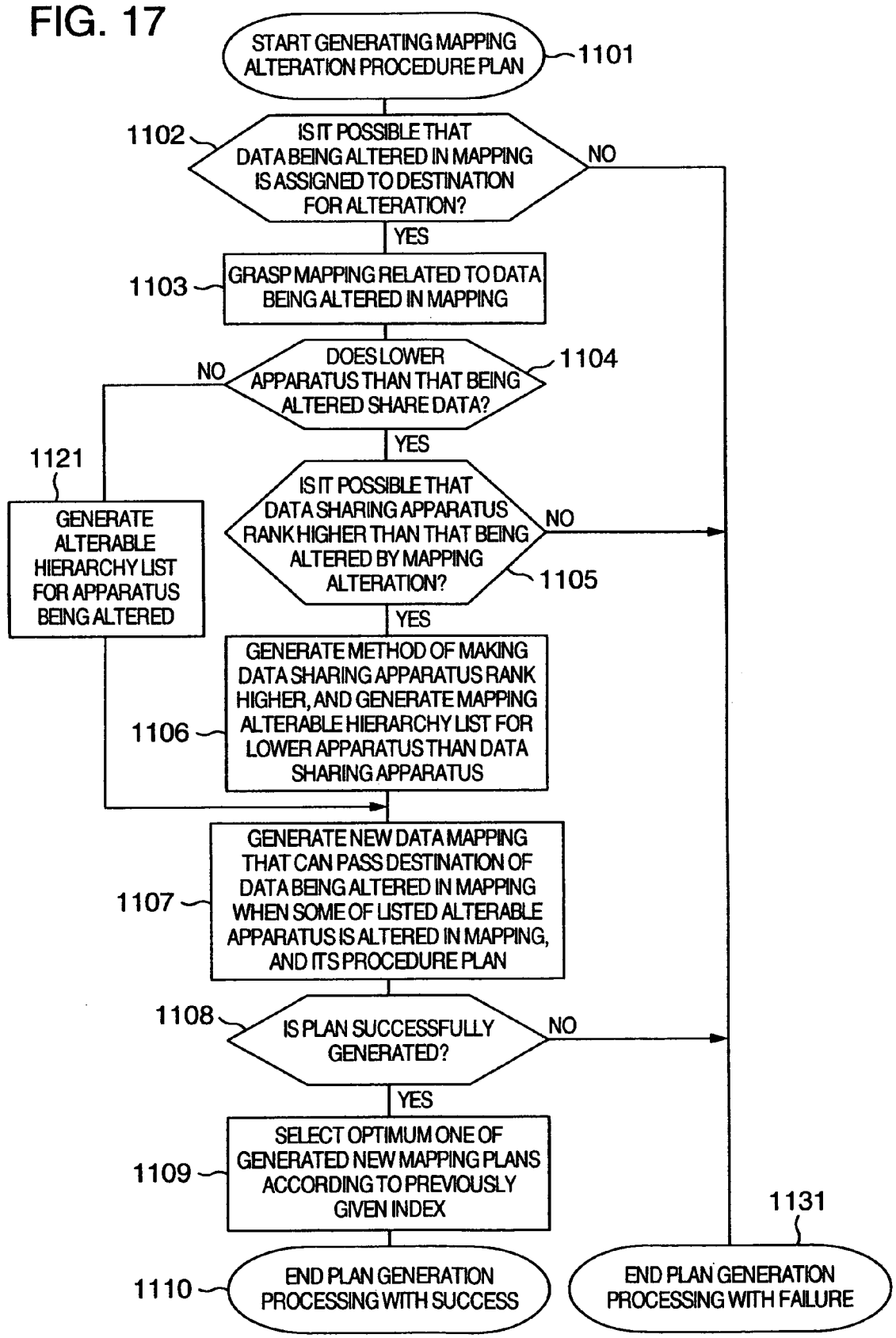
FIG. 17 is a flowchart for the procedure of producing a data mapping alteration processing procedure plan.

FIG. 17 is a flowchart showing the procedure for producing the data mapping alteration procedure plan at step 1005 in FIG. 16.

The server 72 starts processing. At this time, it is assumed that the server is supplied with the associated management structure-matching box 538 to be altered in its data mapping and information about the alteration destination (step 1101).

Then, the server 72 confirms if the specified region to be altered in its data mapping can be assigned to the destination from the following standpoints.

If the region specified as the destination for mapping alteration is the storage region within disk drive 54, it checks to see if effective data is not held in the specified region (if it is the storage region within the disk drive 54 corresponding to that marked with "Free" in the mapping information 10 of a certain virtualization mechanism), and if the specified region has a capacity enough to hold the object being altered in its data mapping.

If the specified region as a mapping destination is the disk drive 54, it is checked to see if the disk drive 54 has a region in which effective data is not held and which has a capacity enough to hold data being altered in data mapping.

If another region is specified as the destination for mapping alteration, the server 72 decides that the object to be altered can be assigned to the destination.

The above confirmation process at this step considers granularity in the mapping alteration (step 1102).

If the object to be altered in data mapping cannot be assigned to the destination, the server 72 informs the administrator that the creation of data mapping alteration procedure has been failed, and ends the processing (step 1131).

If the object to be altered in data mapping can be assigned to the destination, the server 72 grasps the regions of the associated management structure in other virtualization function apparatus relating to the associated management structure matching box 538 to be altered in data mapping, and their mapping. This processing is performed while the mapping management information 321 is being referred to. This mapping is likely to be separated into a plurality of management structures in a certain hierarchical apparatus, but it is assumed that all the above regions and their mapping are grasped hereafter (step 1103).

Then, the server 72 checks to see if the corresponding region in the lower apparatus than that to be altered in data mapping is shared by a plurality of hosts as to the mapping of the associated management structure grasped at step 1103 (step 1104). The server 72 generates an alterable hierarchy list of the hierarchical apparatus capable of altering the data mapping for the object being altered in data mapping, in the case when there is no shared region the list includes as entries all the apparatus, or the apparatus lower than the lowest common apparatus when there is at least one common apparatus (step 1121).

When the corresponding region is judged to be shared at step 1104, the server 72 examines the data mapping from the plurality of hosts that share data, and checks to see if data sharing capability can be established in a higher apparatus by the mapping alteration without copying. If it is possible, it confirms whether the data sharing apparatus can be ranked higher than the apparatus of the object being altered in data mapping by the mapping alteration. This processing is performed while the mapping management information 321 is being referred to (step 1105). If it is not possible, the processing is completed because of the failure (step 1131).

If it is decided to rank higher at step 1105, the server 72 obtains a method for the mapping alteration without copying that brings the common apparatus to a hierarchical level as highest as possible, and sets it at the beginning portion of the procedure. Then, the server 72 generates a mapping alterable hierarchy list of the apparatus that are lower than the higher apparatus (step 1106).

Subsequently, the server 72 generates all mapping alteration plans that make it possible to alter the mapping in any one of the apparatus including in the alterable hierarchy list produced so far and to pass through the mapping alteration destination, and checks to see if the procedure can be produced by the procedure production method given when mentioned about the alteration procedure plan image box 582. If the region within the disk drive 54 or the disk drive 54 specified as the mapping alteration destination is different from that before the mapping alteration, the data migration accompanied by copying is absolutely necessary. If it is not so, two types of patterns can be considered: a pattern due to only the mapping alteration without copying, and the other pattern including the data migration accompanied by copying for the region within the disk drive 54 which is wider than the object being altered in data mapping and which holds no effective data.

At this time, all possible data mapping plans and the procedure for executing the plans are produced (step 1107).

The server 72 that has produced the procedure checks to see if at least one new data mapping and the procedure for achieving the processing are successfully generated at step 1107 (step 1108). If nothing is successfully generated, the processing is completed because of the failure (step 1131).

If at least one procedure plan is successfully produced, the server 72 confirms the number of generated procedure plans, and if a plurality of plans is generated, the server 72 selects the most appropriate one. The following method is employed for the selection.

First, when the load information collection table 322 is not present or does not have enough information, the following plans are examined and selected in the order of the priority mentioned below.
(1) A plan in which the number of times the data migration accompanied by copying is executed is the smallest.
(2) A plan in which the data migration accompanied by copying is executed only within the storage subsystem 50.
(3) A plan in which the number of hierarchical apparatus including up to storage subsystem 50 for executing the data migration accompanied by copying is the smallest.

When a plurality of apparatus rank in the same order, an arbitrary one is selected from those apparatus. When enough information is present in the load information collection table 322, the loads on the disk drive 54 as the mapping alteration destination for the new data mapping and on the I/O path 40 in the mapping are obtained by collecting the associated data with reference to the mapping aggregation information 350 and hierarchical structure information 330.

At this time, when the data unit for load information collection is larger than the data to be altered about data mapping, the following correction is made: "load is distributed in proportion to the size of data region" or for the worst case "it is assumed that the load equivalent to that measured within a data collection unit is independently exerted in all regions belonging to the data collection unit".

Thereafter, the server 72 excludes the data mapping plan in which the total value of load exceeds a threshold previously set in a certain portion, and then selects a data mapping plan on the same basis as when the load information collection table 322 is not present. When all the plans are excluded according to the threshold, a data mapping plan in which the difference from the threshold is the least is selected (step 1109).

Subsequently, the server 72 completes the processing because the data mapping alteration procedure plan has been successfully produced. The steps 1107 and 1109 can be executed at a time (step 1110).

The data mapping alteration procedure generation processing that starts from step 1101 confirms the data sharing hierarchical apparatus and the higher hierarchization of apparatus, but does not include the procedure for restoring the hierarchy to the original state. This is because when the data migration accompanied by copying is performed, it is necessary for the administrator to decide which hierarchical apparatus should perform data sharing. Therefore, after this processing is completed, the procedure plan is presented to the administrator, when the administrator modifies and specifies the data mapping by hand.

Thus, according to the invention, in a computer system in which a plurality of apparatus are used to provide virtual storage regions and data mapping is altered in part or all of those virtual storage regions, a detailed procedure for a desired data mapping can be generated when such mapping is ordered to produce. At this time, specified data may be shared by a plurality of computers. In addition, the user can intuitively order a desired data mapping by use of GUI. According to the invention, since the administrator can simply attain a desired data arrangement, the data mapping management cost can be reduced.

In addition, when a data mapping alteration procedure is generated, the storage regions that a plurality of apparatus can use as mapping alteration destination can be all grasped, and if necessary, those regions can be used even in the mapping alteration process in other apparatus. Thus, the storage regions of storage subsystems within the computer system can be effectively used.

Moreover, when the load information is available, a procedure for attaining the data mapping considering the load information is generated, and thus more satisfactory data mapping can be achieved.

According to the invention, since the administrator can simply attain a desired data arrangement, the data mapping management cost can be reduced.

Also, according to the invention, it is possible to increase the utilization efficiency of the storage regions that the storage subsystems within a computer system have.

Furthermore, according to the invention, more satisfactory data mapping can be achieved in the computer system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
a host computer for executing an application program which accesses data files, said host computer including a file system and a volume manager, said file system operatively coupled with said application program for converting access to the data files by said application program into accesses to first logical data volumes, said volume manager operatively coupled with said file system for converting accesses to the first logical data volumes into accesses to first virtual data volumes;
a first virtual switch operatively coupled to said volume manager via a network for converting accesses to the first virtual data volumes into accesses to second virtual data volumes;
a second virtual switch operatively coupled to said first virtual switch via the network for converting accesses to the second virtual data volumes into accesses to second logical data volumes;
a plurality of storage subsystems operatively coupled to said second virtual switch via the network, each of said storage subsystems including a plurality of disk drives and a controller for controlling the disk drives, said controller converting accesses to the second logical data volumes into accesses to physical data blocks of the disk drives, whereby said file system, said volume manager, said first virtual switch, said second virtual switch and said storage subsystems are layered in order from a highest layer to a lowest layer; and
a data mapping management server coupled to said host computer, said first virtual switch, said second virtual switch and said storage subsystems via the network, for selecting an access path of a data volume flowing from said file system to one of said storage subsystems through said first and second virtual switches by using a data mapping management table obtained by collecting a mapping information table stored in said volume manager, said first virtual switch, and said second virtual switch, each mapping information table representing correspondence relationships between locations of data volumes inputted and locations of corresponding data volumes to be outputted,
wherein, when receiving a command instructing migration of a logical data volume stored in one of said storage subsystems as a source storage subsystem to a new logical data volume stored in another storage subsystem as a destination storage subsystem, said data mapping management server:

analyzes the data mapping management table to identify a virtual data volume to be migrated in said second virtual switch corresponding to the logical data volume to be migrated in said source storage subsystem;

creates a new virtual data volume in said second virtual switch so that the new virtual data volume is coupled to the new logical data volume of said destination storage subsystem;

copies the logical data volume to be migrated to the new logical data volume;

copies the virtual data volume to be migrated to the new virtual data volume according to migration of the logical data volume; and alters mapping information in the mapping information tables held in said first and second virtual switches and in the data mapping management table according to migration of the logical data volume from said source storage subsystem to said destination storage subsystem.

2. The computer system according to claim 1, wherein the mapping information tables include load information indicative of loads exerted on data volumes of an associated layer on a data volume basis, and said data mapping management server selects the access path of a data volume flowing from said file system to one of said storage subsystems through said first and second virtual switches based on the load information of the mapping information tables.

3. The computer system according to claim 1, wherein, if the virtual data volume to be migrated is shared with said host computer and another host computer which is coupled to said data mapping management server via the network, said data mapping management server prevents both said host computers from accessing the virtual data volume to be migrated at a layer higher than said second virtual switch, and after completion of alteration of mapping information in the mapping information tables, permits both said host computers to access to said layer higher than said second virtual switch.

4. A method for managing data mapping in a computer system including:

a host computer for executing an application program which accesses to data files, said host computer including a file system and a volume manager, said file system being operatively coupled to said application program for converting accesses to the data files by said application program into accesses to first logical data volumes, and said volume manager being operatively coupled to said file system for converting accesses to the first logical data volumes into accesses to first virtual data volumes;

a first virtual switch in communication with said volume manager via a network for converting accesses to the first virtual data volumes into accesses to second virtual data volumes;

a second virtual switch in communication with said first virtual switch via the network, for converting accesses to the second virtual data volumes into accesses to second logical data volumes;

storage subsystems in communication with said second virtual switch via the network, said storage subsystems including a plurality of disk drives and a controller for controlling the disk drives, said controller converting accesses to the second logical data volumes into accesses to physical data blocks of the disk drives, whereby said file system, said volume manager, said first virtual switch, said second virtual switch and said storage subsystems are layered in order from a highest layer to a lowest layer; and a data mapping management server operatively coupled to said host computer, said first virtual switch, said second virtual switch and said storage subsystems via the network, for selecting an access path of a data volume flowing from said file system to one of said storage subsystems through said first and second virtual switches by using a data mapping management table obtained by collecting a mapping information table stored in said volume manager, said first virtual switch and said second virtual switch, each mapping information table representing correspondence relationships between locations of data volumes inputted and locations of corresponding data volumes to be outputted, said method executed by said data mapping management server comprising steps of:

receiving a command instructing migration of a logical data volume stored in one of said storage subsystems as a source storage subsystem to a new logical data volume stored in another storage subsystem as a destination storage subsystem;

analyzing the mapping information tables to identify a virtual data volume to be migrated in said second virtual switch corresponding to the logical data volume to be migrated in said source storage subsystem;

creating a new virtual data volume in said second virtual switch so that the new virtual data volume is coupled to the new logical data volume of said destination storage subsystem;

copying the logical data volume to be migrated to the new logical data volume;

copying the virtual data volume to be migrated to the new virtual data volume according to migration of the logical data volume; and altering mapping information in the mapping information tables held in said first and second virtual switches and in the data mapping management table according to migration of the logical data volume from said source storage subsystem to said destination storage subsystem.

5. The method according to claim 4, wherein the mapping information tables include load information indicative of loads exerted on data volumes of an associated layer on a data volume basis, and said data mapping management server selects the access path of a data volume flowing from said file system to one of said storage subsystems through said first and second virtual switches based on the load information of the mapping information tables.

6. The method according to claim 4, wherein, if the virtual data volume to be migrated is shared with said host computer and another host computer which is coupled to said data mapping management server via the network, said data mapping management server prevents both said host computers from accessing the virtual data volume to be migrated at a layer higher than said second virtual switch, and after completion of alteration of mapping information in the mapping information tables, permits both said host computers to access to said layer higher than said second virtual switch.

* * * * *